(12) United States Patent
Kayode et al.

(10) Patent No.: US 12,379,515 B2
(45) Date of Patent: Aug. 5, 2025

(54) SYSTEMS AND METHODS FOR UPDATING HYDROCARBON RESERVOIR PARAMETERS

(71) Applicant: Saudi Arabian Oil Company, Dhahran (SA)

(72) Inventors: Babatope Kayode, Dhahran (SA); Santiago Ariel Ganis, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 114 days.

(21) Appl. No.: 18/487,769

(22) Filed: Oct. 16, 2023

(65) Prior Publication Data

US 2025/0123416 A1   Apr. 17, 2025

(51) Int. Cl.
G06F 30/20 (2020.01)
G01V 1/28 (2006.01)

(52) U.S. Cl.
CPC ...... *G01V 1/282* (2013.01); *G01V 2210/6244* (2013.01); *G01V 2210/6246* (2013.01); *G01V 2210/66* (2013.01)

(58) Field of Classification Search
CPC .......... G01V 1/282; G01V 2210/6244; G01V 2210/6246; G01V 2210/66
USPC ............................................................ 703/2
See application file for complete search history.

(56) References Cited

U.S. PATENT DOCUMENTS

| | | | |
|---|---|---|---|
| 7,073,577 B2 | 7/2006 | Yu | |
| 9,151,868 B2 | 10/2015 | Levitan | |
| 9,946,974 B2 | 4/2018 | Burch et al. | |
| 11,085,291 B2 | 8/2021 | Kayode | |
| 2012/0024524 A1 | 2/2012 | Marsimovich et al. | |
| 2013/0268247 A1 | 10/2013 | Rowan | |
| 2013/0282286 A1 | 10/2013 | Thorne et al. | |
| 2014/0149041 A1 | 5/2014 | Sung et al. | |
| 2016/0237814 A1 | 8/2016 | Fripp et al. | |
| 2021/0334433 A1* | 10/2021 | Taieb | G01V 20/00 |
| 2022/0027616 A1 | 1/2022 | Kayode et al. | |
| 2023/0350096 A1* | 11/2023 | Khan | G06N 3/09 |

FOREIGN PATENT DOCUMENTS

| WO | WO 2009155127 | 12/2009 |
|---|---|---|
| WO | WO 2012154579 | 11/2012 |

OTHER PUBLICATIONS

Kortekaas (acquisition of reservoir data and their incorporation in the construction and updating of dynamic, integrated reservoir, (12 pages)) (Year: 1998).*

(Continued)

*Primary Examiner* — Andre Pierre Louis
(74) *Attorney, Agent, or Firm* — Fish & Richardson P.C.

(57) ABSTRACT

Techniques for updating hydrocarbon parameters include identifying well data associated with wells formed in subterranean formations of a hydrocarbon reservoir; determining a data density value for each well; assigning each well into a pressure grouping based on a wellbore pressure similarity of the well relative to an initial pattern well; generating a two-dimensional (2D) model of the hydrocarbon reservoir; converting the 2D model into a three-dimensional (3D) model of the hydrocarbon reservoir; and updating a permeability or a porosity associated with a grid cell of the 3D model.

30 Claims, 18 Drawing Sheets

(56) References Cited

OTHER PUBLICATIONS

International Search Report and Written Opinion in International Appln. No. PCT/US2024/051414, mailed on Jan. 24, 2025, 16 pages.

Kayode et al., "Pressure Conditioned Modeling: Application of Time-Lapse Shut-in Pressure Data to Map Connected Reservoir Regions for Conditioning of 3-D Geomodel Property Distributions," Prepared for presentation at the SPE Kingdom of Saudi Arabia Annual Technical Symposium and Exhibition held in Dammam, Saudi Arabia, Apr. 23-26, 2018, 15 pages.

Al-Ajmi et al., "Permeability Estimation Using Hydraulic Flow Units in a Central Arabia Reservoir," SPE Annual Technical Conference and Exhibition held in Dallas, Texas, Oct. 1-4, 2000, 14 pages.

Bonet-Cunha et al., "A Hybrid Markov Chain Monte Carlo Method for Generating Permeability Fields Conditioned to Multi-well Pressure Data and Prior Information," Presented for Presentation at the 1996 SPE Annual Technical Conference and Exhibition held in Denver, Colorado, Oct. 6-9, 1996, 16 pages.

Ceyhan, "Generation of Porosity and Permeability Fields Conditioned to Geostatistical and Pressure Transient Data," Prepared for presentation at the 1998 SPE European Petroleum Conference, the Netherlands, Oct. 20-22, 1998, 10 pages.

He et al., "Conditioning Stochastic Reservoir Models to Well Test Data," Presented at the SPE Annual Technical Conference and Exhibition, Oct. 5-8, 1997, 12 pages.

Kayode et al., "Application of Data-Mining Algorithms to Parameterize Static and Dynamic Models," Prepared for Presentation at the SPE Symposium: Leverage Artificial Intelligence to Shape the Future of the Energy Industry held in Al Khobar, Saudi Arabia, Jan. 19, 2023, 18 pages.

Kayode et al., "Application of Historical Pressures for Mapping Reservoir Heterogeneity in Brown Fields," Prepared for presentation at the SPE Reservoir Characterisation and Simulation Conference and Exhibition held in Abu Dhabi, Jan. 24-26, 2023, 22 pages.

Kayode et al., "Connected Reservoir Regions Map Created From Time-Lapse Pressure Data Shows Similarity to Other Reservoir Quality Maps in a Heterogeneous Carbonate Reservoir," Prepared for presentation at the International Petroleum Technology Conference held in Beijing, China, Mar. 26-28, 2019, 13 pages.

Landa et al., "Reservoir Characterization Constrained to Well Test Data: A Field Example," Presented at the SPE Annual Technical Conference and Exhibition, Oct. 6-9, 1996, 16 pages.

Mireault et al., "Reservoir Engineering for Geologists Part 5A—Material Balance Analysis," Reservoir, Feb. 2008, 2:24-26, 3 pages.

Reynolds et al., "Reparameterization Techniques for Generating Reservoir Descriptions Conditioned to Variograms and Well-Test Pressure Data," SPE 30588, SPE Journal Issue 1, vol. 4, Dec. 1996, 14 pages.

Skinner, "Excess Pressure and Reservoir Compartmentalization in the Sable Subbasin, Offshore Nova Scotia," Thesis for the Degree of Master of Science, Dalhousie University, May 2016, 124 pages.

Srinivasan et al., "Simulation of Permeability Field Conditioned to Well Test Data," Presented at the SPE Annual Technical Conference and Exhibition, Sep. 27-30, 1998, 15 pages.

Vaughan, "Extending the life of Brown Field Developments by Acoustic Impedance-Conditioned 3D Reservoir Modelling: An Example from Mature Gulf of Suez Carbonate Producing Asset (Ras Fanar Field), Egypt," Presented at the International Petroleum Technology Conference in Malaysia, Dec. 10-12, 2014, 10 pages.

\* cited by examiner

SYSTEMS AND METHODS FOR UPDATING HYDROCARBON RESERVOIR PARAMETERS

TECHNICAL FIELD

This disclosure relates to systems and methods for updating hydrocarbon reservoir parameters and, more particularly, with updating one or more property fields, such as permeability, of a hydrocarbon reservoir of a static model until a dynamic response, such as pressure, matches with observed data.

BACKGROUND

History-matching (HM) is a process of updating a property field of a static model until its dynamic response matches with observed data. Traditionally, HM focuses on improving well matches and sometimes results in localized permeability updates around individual wells.

SUMMARY

In an example implementation, a computer-implemented method of updating one or more hydrocarbon parameters includes identifying, with a computing system, well data associated with a plurality of wells formed in one or more subterranean formations of a hydrocarbon reservoir, the well data including at least one recorded wellbore pressure associated with each well in the plurality of wells; determining, with the computing system, a data density value for each well of the plurality of wells, where the data density value includes a number of time windows in which the well has a recorded wellbore pressure; assigning, with the computing system, each well of the plurality of wells into a pressure grouping of a plurality of pressure groupings based on a wellbore pressure similarity of the well relative to an initial pattern well that is defined by a maximum data density value; generating, with the computing system, a two-dimensional (2D) model of the hydrocarbon reservoir that includes a plurality of grid cells, each grid cell assigned to one of the plurality of pressure groupings based on an assigned pressure grouping of a well of the plurality of wells that is located within or nearest the grid cell; converting, with the computing system, the 2D model into a three-dimensional (3D) model of the hydrocarbon reservoir by duplicating the assigned one of the plurality of pressure groupings of each grid cell along a column of vertical grid cells; and updating, with the computing system, at least one of a permeability or a porosity associated with a grid cell of the 3D model that is assigned to each of the plurality of pressure groupings based on a history match of the one or more wells production data or pressure data.

An aspect combinable with the example implementation further includes generating, with the computing system, one or more well field management operations based on the history match of the one or more wells production data or pressure data.

Another aspect combinable with any of the previous aspects further includes determining, with the computing system, at least one well of the plurality of wells that has a data density value less than a threshold value; and removing, with the computing system, the determined at least one well from the plurality of wells.

In another aspect combinable with any of the previous aspects, the assigning includes comparing, with the computing system, the at least one recorded wellbore pressure associated with each well in the plurality of wells against the recorded wellbore pressure associated with the initial pattern well to determine a similarity coefficient for each well of the plurality of wells exclusive of the initial pattern well; assigning, with the computing system, each well with the similarity coefficient greater than a particular value to the pressure grouping of the initial pattern well; determining, with the computing system, another initial pattern well that is defined by a next-most maximum data density value; comparing, with the computing system, the at least one recorded wellbore pressure associated with each unassigned well in the plurality of wells against the recorded wellbore pressure associated with the another initial pattern well to determine a similarity coefficient for each unassigned well of the plurality of wells exclusive of the another initial pattern well; and assigning, with the computing system, each unassigned well with the similarity coefficient greater than the particular value to the pressure grouping of the another initial pattern well.

Another aspect combinable with any of the previous aspects further includes updating, with the computing system, recorded pressure data in a time window associated with the initial pattern well with recorded pressure data of the each well assigned to the pressure grouping of the initial pattern well; and updating, with the computing system, recorded pressure data in a time window associated with the another initial pattern well with recorded pressure data of the each well assigned to the pressure grouping of the another initial pattern well.

In another aspect combinable with any of the previous aspects, the assigning includes determining, with the computing system, for each removed well, a differential between the recorded pressure data of the removed well and a pressure of each of the plurality of pressure groupings; and assigning, with the computing system, each removed well to a particular pressure grouping based on the differential between the recorded pressure data of the removed well and the pressure the particular pressure grouping being minimal.

In another aspect combinable with any of the previous aspects, the differential includes a root mean square differential.

Another aspect combinable with any of the previous aspects further includes determining, with the computing system, for each cell in the 3D model associated with a particular pressure grouping, a depth level of the cell relative to a free water level; and assigning, with the computing system, each cell with the depth level below the free water level as an aquifer cell.

In another aspect combinable with any of the previous aspects, the depth level of the cell is based on a perforation depth of a perforation in the well.

Another aspect combinable with any of the previous aspects further includes associating, with the computing system, each aquifer cell to the particular pressure grouping.

Other general implementations according to the present disclosure include computing systems and non-transitory, computer readable media. For example, another general implementation includes a distributed computing system that includes one or more memory modules; and one or more hardware processors communicably coupled to the one or more memory modules and configured to execute instructions stored in the one or more memory modules to perform operations including the steps of any one of the computer-implemented methods described herein.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
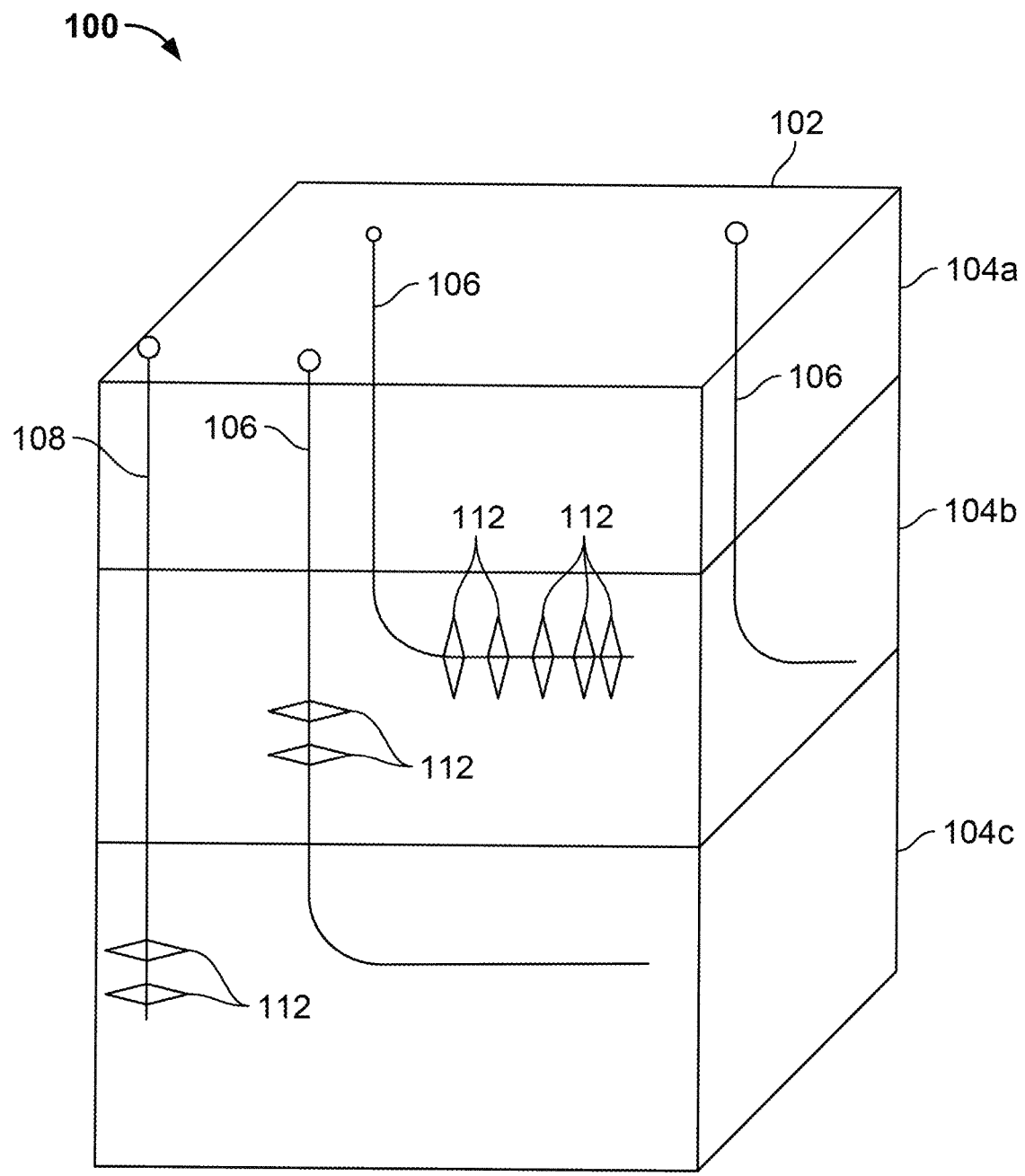
FIG. 1A is a schematic illustration of a hydrocarbon reservoir system including one or more wells drilled therein according to the present disclosure.

The present disclosure describes implementations of systems and methods for history matching properties of a well field through a pattern matching algorithm that uses a divide and conquer approach to populate each well within the field into a particular, unique pressure group based on observed global pressure data for the field. The well field reservoir is then populated into independent regions based on the pressure grouping of the wells nearest the particular region. A resultant three-dimensional array of the regions (derived from a two-dimensional array of the well regions) is then included in a simulator run (for example, by a commercially-available simulator such as Eclipse) and used for region-based permeability updates (region by region).

In some aspects, reservoir regions are determined by a simulator through an automatic clustering of a global set of observed pressure data using a pattern recognition algorithm to allocate a pressure region number to every well. The wells' region array can then be populated through an algorithm (for example, a Python Voronoi algorithm), which allocates a region number to every grid-block based on the nearest well's region. The 2D region array from the algorithm can then be extended into a 3D array by duplicating each 2D array element across a column of blocks (for example, that represents the well depth). The resulting 3D array can be included in a simulation run and used for region-based permeability updates for pressure history-matching. The simulator can also include aquifer regions, which are sections of the global aquifer that is in contact with any pressure region of the hydrocarbon reservoir.

In some aspects, because all the wells within each pressure-designated region have historical pressures that are similar in magnitude and trend, the simulator plots the simulated pressures for the wells within a group on the same chart as the region's global set of historical pressures. Therefore, a history matching of a group of wells can be sought by using a common regional permeability update, thereby reducing the need for localized permeability updates around individual wells in the hydrocarbon reservoir. For instance, in a massive reservoir with several hundreds of wells, techniques according to the present disclosure can provide for a divide and conquer strategy to achieve a fast and reliable pressure history matching.

Implementations according to the present disclosure can be differentiated from a majority of automatic pressure history matching conventional techniques that rely on misfit coefficients, which are aggregated from individual well statistics. Such conventional techniques seek to improve the individual well statistics with strategies that are focused on permeability updates around the individual wells. In contrast, systems and methods according to the present disclosure improve well statistics through sub-global permeability updates, ensuring simultaneous improvement on multiple wells' pressure match statistics.

After updating permeability properties during history matching, the resulting model according to the present disclosure can be used to plan new infill wells. Example implementations presented here can provide for increased knowledge of various regions of the reservoir that have similar behavior, history-match each region as a single unit, and then subsequent infill wells that are drilled within each region would have more reliable results. If implementations according to the present disclosure are not used and wells are individually history-matched using near well permeability updates, the future infill well locations may not benefit from history-matching permeability updates, and the prediction well results may be unreliable.

Figure 1C:
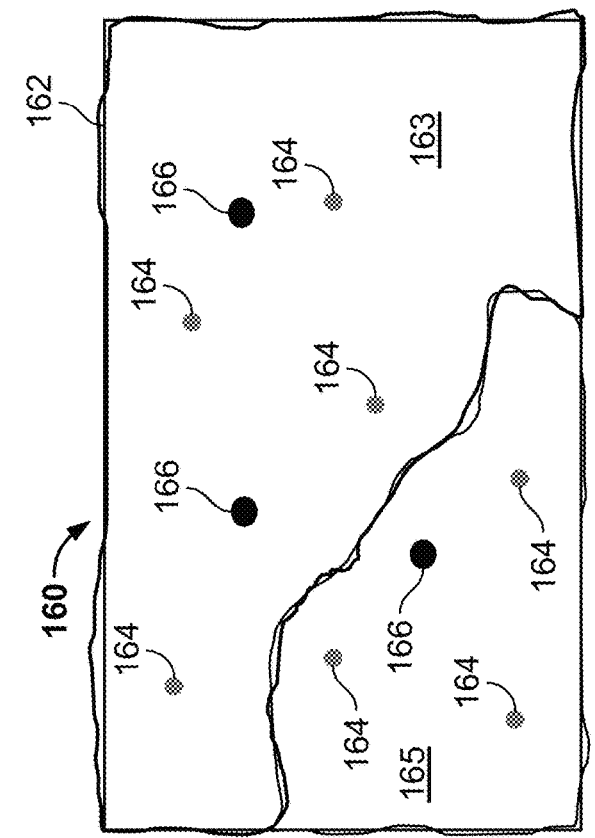
FIG. 1C is a schematic illustration of a reservoir with existing and infill wells planned according to the present disclosure with pressure clustering and pressure region divisions.
Figure 1B:
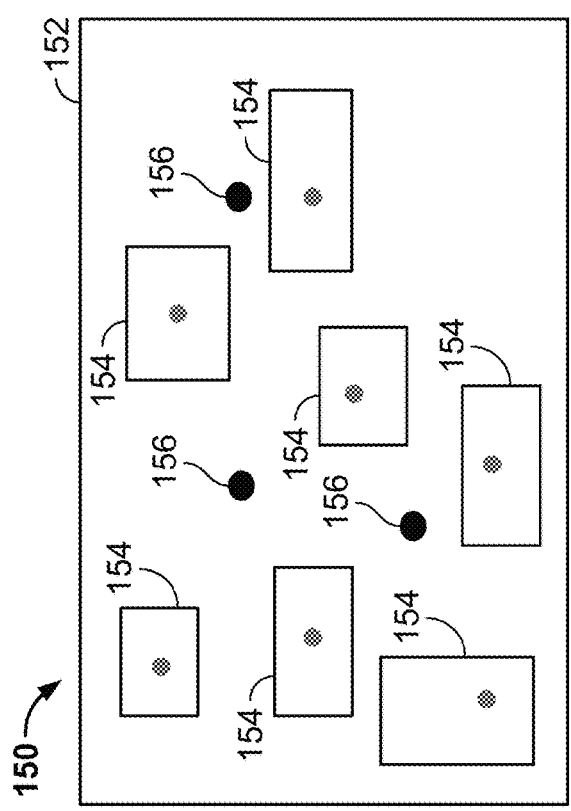
FIG. 1B is a schematic illustration of a reservoir with existing and infill wells planned according to conventional techniques of individually history-matched wells using individual near-well permeability updates.

These concepts are graphically illustrated in FIGS. 1B and 1C. FIG. 1B is a schematic illustration 150 of a reservoir 152 with existing wells 154 and infill wells 156 planned according to conventional techniques of individually history-matched wells using individual near-well permeability updates. As shown, future wells 156 may miss out of the learnings and necessary modifications used for single-well history-matching. FIG. 1C is a schematic illustration 160 of a reservoir 162 with existing wells 164 and infill wells 166 planned according to the present disclosure with pressure clustering and pressure region divisions. Here, pressure regions 163 and 165 have been determined according to the present disclosure. Each region 163 and 165 is globally history-matched with permeability updates. As shown in this figure, future wells 166 in each region 163/165 would benefit from the learnings and modifications resulting from history-matching the existing wells 164 in each region 163/165.

Now turning to FIG. 1A, this figure is a schematic illustration of a hydrocarbon reservoir system 100 including one or more wells drilled therein, thus illustrating a system 100 on which one or more described processes can be implemented. As shown, system 100 includes wells 106 and 108 (of which there can be one, some, or many of each) formed from a terranean surface 102 to one or more subterranean zones 104a-104c located below the terranean surface 102. In this example, one, some, wells 106 can represent directional wells, such as wells that are deviated from vertical, include radius and/or horizontal portions, laterals, or a combination thereof. Well 108 can represent vertical wells, which, generally, include only a vertical or substantially vertical portion. System can have any number of wells 106 and/or 108. One or more wells 106 and/or 108 can be uncased or include uncased sections, such as a horizontal portion that may be fully or partially an open hole completion. In some aspects, one or more wells 106 and/or 108 can include perforations 112.

Although illustrated as generally vertical portions and generally horizontal portions, such parts of the wells 106 and 108 can deviate from exactly vertical and exactly horizontal (for example, relative to the terranean surface 102) depending on the formation techniques of the particular wellbore 108a-108c, type of rock formation in the subterranean formations 104a-104c, and other factors. Generally, the present disclosure contemplates all conventional and novel techniques for forming the wells 106 and 108 from the surface 102 into the subterranean formations 104a-104c.

Although labeled as a terranean surface 102, this surface may be any appropriate surface on Earth (or other planet) from which drilling and completion equipment may be staged to recover hydrocarbons from a subterranean zone. For example, in some aspects, the surface 102 may represent a body of water, such as a sea, gulf, ocean, lake, or otherwise. In some aspects, all are part of a drilling and completion system, including hydraulic fracturing system 100, may be staged on the body of water or on a floor of the body of water (for example, ocean or gulf floor). Thus, references to terranean surface 102 includes reference to bodies of water, terranean surfaces under bodies of water, as well as land locations.

Subterranean formations 104a-104c may include one or more rock or geologic formations that bear hydrocarbons (for example, oil, gas) or other fluids (for example, water) to be produced to the terranean surface 102 and, either individually, collectively, or otherwise, represent a hydrocarbon reservoir. For example, the rock or geologic formations can be shale, sandstone, or other type of rock, typically, that may be hydraulically fractured to produce or enhance production of such hydrocarbons or other fluids. In some aspects, one or more of the subterranean formations 104a-104c comprise different rock formations (for example, shales, sandstones, or otherwise). In some aspects, one or more of the subterranean formations 104a-104c comprise similar rock formations (for example, shales, sandstones, or otherwise) but in distinct layers represented by the formations 104a-104c (for example, upper layer, lower layer).

Figure 2:
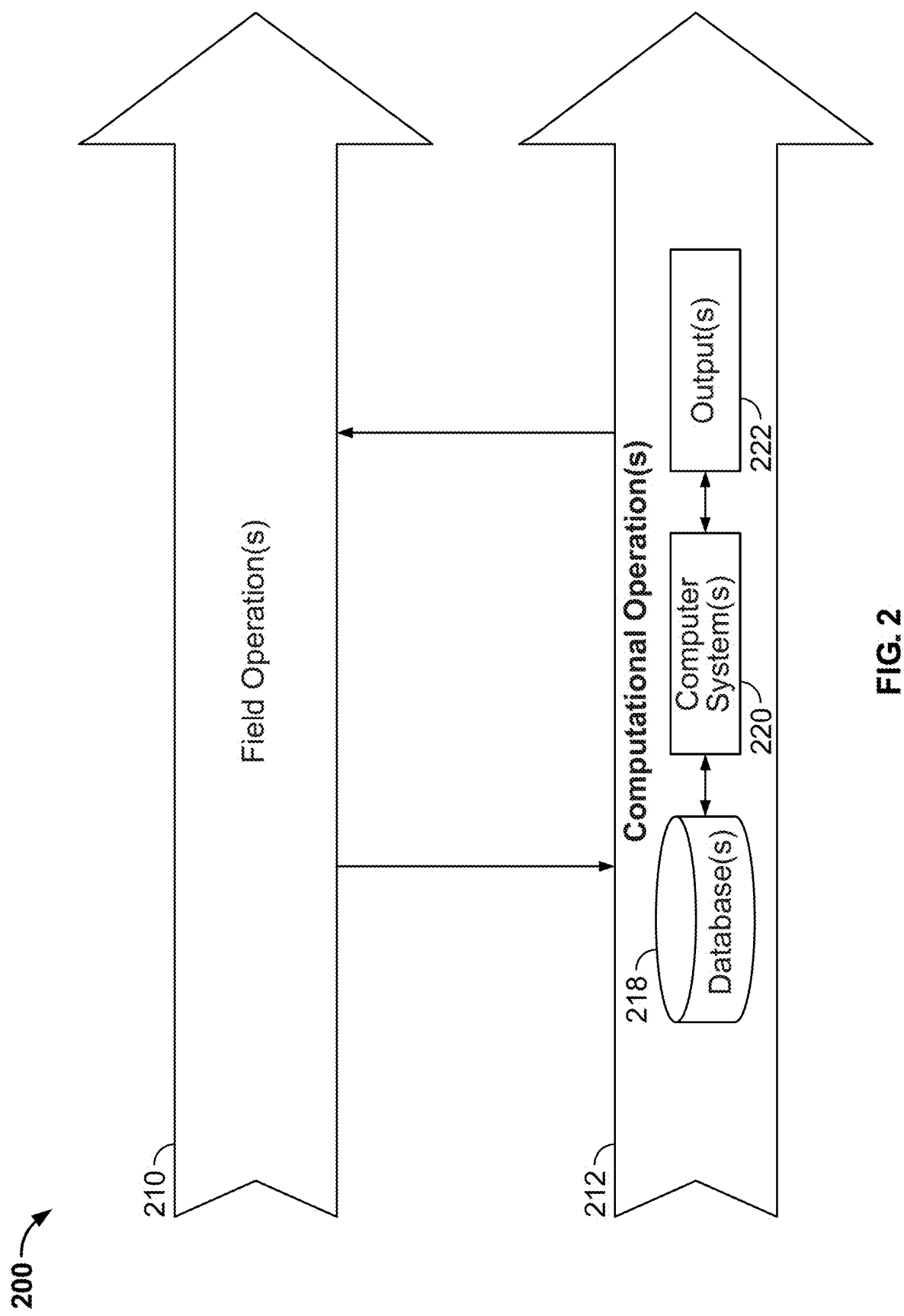
FIG. 2 is a schematic illustration of a hydrocarbon production or monitoring system that includes both one or more field operations and one or more computational operations according to the present disclosure.

FIG. 2 illustrates a hydrocarbon production or monitoring system 200 that includes both one or more field operations 210 (deployed, for example, in the hydrocarbon reservoir system 100 including one or more wells shown in FIG. 1A) and one or more computational operations 212, which exchange information and control exploration for the production of hydrocarbons. In some implementations, outputs of techniques of the present disclosure can be performed before, during, or in combination with the hydrocarbon production operations 200, specifically, for example, either as field operations 210 or computational operations 212, or both.

Examples of field operations 210 include forming/drilling a wellbore, hydraulic fracturing, producing through the wellbore, injecting fluids (such as water) through the wellbore, to name a few. In some implementations, methods of the present disclosure can trigger or control the field operations 210. For example, the methods of the present disclosure can generate data from hardware/software including sensors and physical data gathering equipment (for example, seismic sensors, well logging tools, flow meters, and temperature and pressure sensors). The methods of the present disclosure can include transmitting the data from the hardware/software to the field operations 210 and responsively triggering the field operations 210 including, for example, generating plans and signals that provide feedback to and control physical components of the field operations 210. Alternatively or in addition, the field operations 210 can trigger the methods of the present disclosure. For example, implementing physical components (including, for example, hardware, such as sensors) deployed in the field operations 210 can generate plans and signals that can be provided as input or feedback (or both) to the methods of the present disclosure.

Examples of computational operations 212 include one or more computer systems 220 that include one or more processors and computer-readable media (for example, non-transitory computer-readable media) operatively coupled to the one or more processors to execute computer operations to perform the methods of the present disclosure. The computational operations 212 can be implemented using one or more databases 218, which store data received from the field operations 210 and/or generated internally within the computational operations 212 (for example, by implementing the methods of the present disclosure) or both. For example, the one or more computer systems 220 process inputs from the field operations 210 to assess conditions in the physical world, the outputs of which are stored in the databases 218. For example, seismic sensors of the field operations 210 can be used to perform a seismic survey to map subterranean features, such as facies and faults. In performing a seismic survey, seismic sources (for example, seismic vibrators or explosions) generate seismic waves that propagate in the earth and seismic receivers (for example, geophones) measure reflections generated as the seismic waves interact with boundaries between layers of a subsurface formation. The source and received signals are provided to the computational operations 212 where they are stored in the databases 218 and analyzed by the one or more computer systems 220.

In some implementations, one or more outputs 222 generated by the one or more computer systems 220 can be provided as feedback/input to the field operations 210 (either as direct input or stored in the databases 218). The field operations 210 can use the feedback/input to control physical components used to perform the field operations 210 in the real world.

For example, the computational operations 212 can process the seismic data to generate three-dimensional (3D) maps of the subsurface formation. The computational operations 212 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 212 to process new information about the formation and control the drilling to adjust to the observed conditions in real-time.

The one or more computer systems 220 can update the 3D maps of the subsurface formation as information from one exploration well is received and the computational operations 212 can adjust the location of the next exploration well based on the updated 3D maps. Similarly, the data received from production operations can be used by the computational operations 212 to control components of the production operations. For example, production well and pipeline data can be analyzed to predict slugging in pipelines leading to a refinery and the computational operations 212 can control machine operated valves upstream of the refinery to reduce the likelihood of plant disruptions that run the risk of taking the plant offline.

In some implementations of the computational operations 212, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart or are located in different countries or other jurisdictions.

Figure 3A:
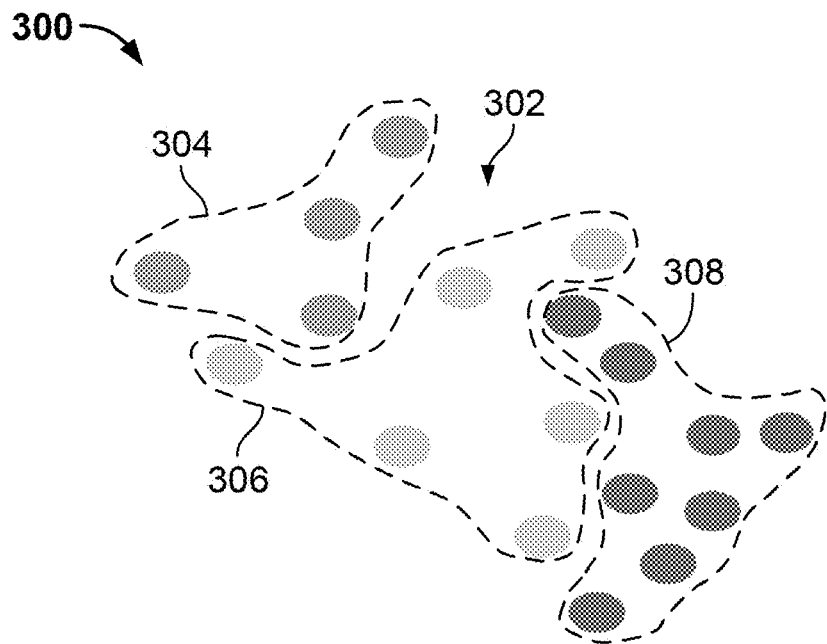
FIGS. 3A-3D are graphic illustrations of a hydrocarbon reservoir including multiple wells grouped within multiple pressure groupings according to the present disclosure.

FIGS. 3A-3D are graphic illustrations of a hydrocarbon reservoir including multiple wells grouped within multiple pressure groupings according to the present disclosure. These figures show or partially show an example implementation of processes according to the present disclosure to determine pressure groupings of multiple wells formed in a hydrocarbon reservoir. For example, these figures show that a pressure clustering can be established, each cluster comprising of wells having similar pressure patterns. The pressure patterns could be labelled 1, 2, 3 . . . n for example, where each well belongs to a unique pressure group between 1 and n as shown in FIG. 3A. This figure shows a graphical representation 300 of a hydrocarbon reservoir 302 include multiple wells, shown as dots. In this case, there are three pressure groupings 304, 306, and 308. The wells within each pressure grouping 304, 306, and 308 are shown as included within the closed, dotted shape of each grouping.

Figure 3B:
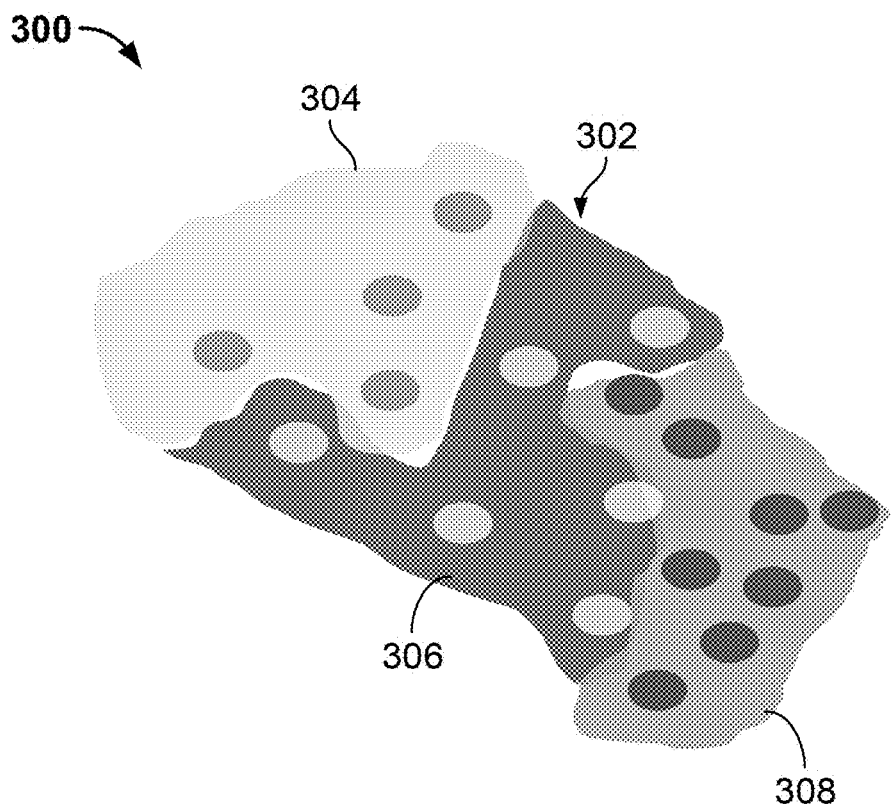

As shown in FIG. 3B, the individual wells' pressure group (304, 306, or 308) are then used to populate pressure groups to each simulation cells. The pressure groupings in FIG. 3A are discrete at well locations, whereas the pressure groups in FIG. 3B are each continuous over regions of the reservoir 302. During history-matching, permeability updates can then be conducted at the scale of the pressure groupings (304, 306, or 308) instead of at the individual well level of the wells shown in the reservoir 302. This scale can help ensure faster history-matching through simultaneous history-matching improvement on multiple wells at once.

Figure 3C:
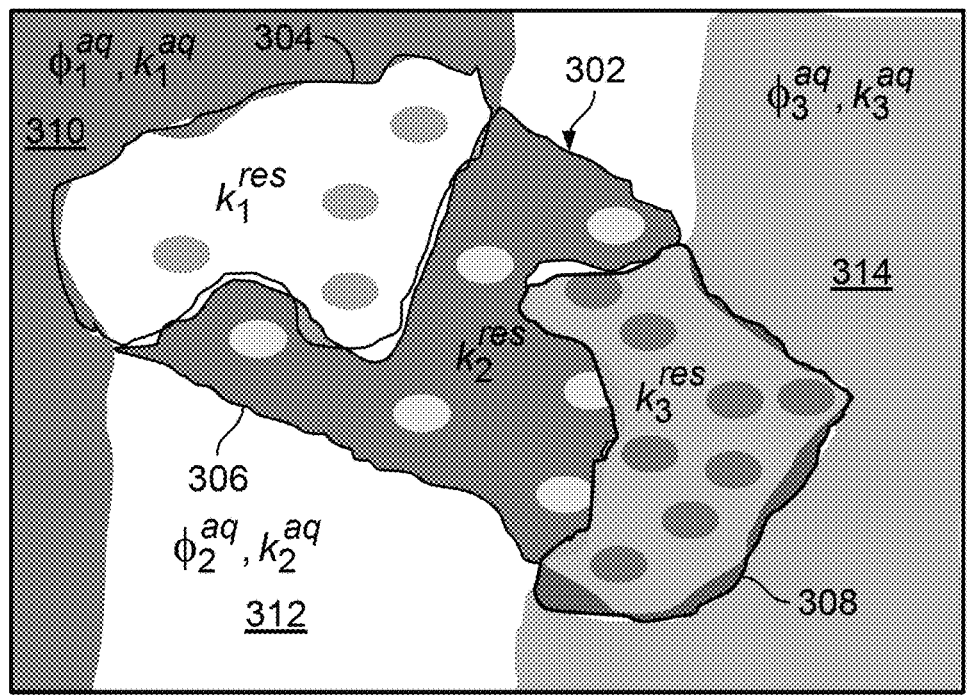

Aquifer regions within the reservoir 302 can also be created automatically. As shown in FIG. 3C, aquifer regions 310, 312, and 314 are the sections of the model's aquifer that are in direct contact with each pressure grouping 304, 306, and 308. Three aquifer regions 310, 312, and 314 are shown in FIG. 3C (but there can be more). In addition, this figures also shows parameters to be optimized to obtain each pressure region's history-matching of pressure. As examples, $k_1^{aq}$ is the permeability multiplier of aquifer region 310, $k_1^{res}$ is the permeability multiplier of the pressure region 306, and $ø_1^{aq}$ is the porosity multiplier of aquifer region 310. As described more fully herein, the pressure clustering or grouping is achieved through a pattern recognition algorithm, while the creation of the reservoir region achieved through the simulator algorithm (for example, the Voronoi algorithm). The created reservoir region or model (for example, in 3D) as well as the created aquifer regions (in array form) can be attached to a simulation model file.

Figure 3D:
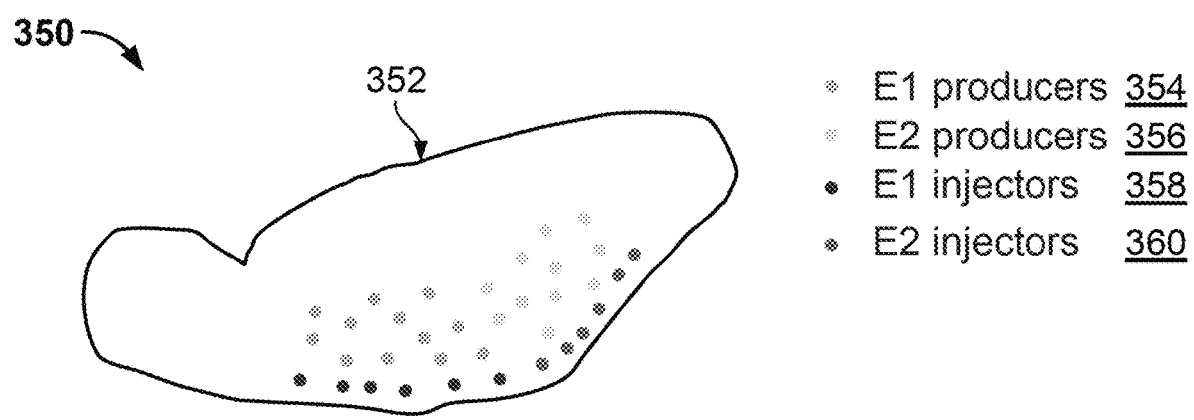

In example implementations, during the numerical simulation, various well groups can be defined as shown in FIG. 3D. This figure shows a graphic 350 of a hydrocarbon reservoir 352 in which multiple well groups 354, 356, 358, and 360 are designated. Well groups could sometimes be used for injection voidage replacement purposes where a set of injectors could be used to inject a quantity of water equal to the total liquid production from a given set of producers in order to maintain reservoir pressure at desirable limits. A simulation model is setup giving group names to a set of wells in order to control them. In FIG. 3D, two groups of wells are shown in the reservoir 352; each group has a set of producers (groups 354 and 356) and a set of injectors (groups 358 and 360).

To obtain the groups' total production and injection figures, the values from individual wells within each group can be summed. However, in order to monitor the performance (for example, STOIIP, Recovery factor, average pressure) of the production-injection wells, it may be necessary to define a reservoir region (called for example E1 or well groups 354 and 358 in FIG. 3D). Conventionally, it would be required to create a polygon around the wells of interest and all the simulation cells bounded by the polygon is assigned to a common fluid-in-place region. The average pressure, recovery factor, and other parameters can then be monitored within the reservoir regions.

As shown in FIG. 3D for example, wells 354 and wells 358 are in the same production region, but the processes described in this disclosure can be used to create a 3D grid array representing this production region and, in this case, a reservoir region of the E1 wells. The purpose of the 3D region created in FIG. 3D is used to monitor field performance such as recovery factor, average region pressure, other performance. The workflow in FIGS. 4A and 4B can be used for the creation of regions from pressure, but a similar work flow can be used for the creation of regions from production groups.

Figure 4A:
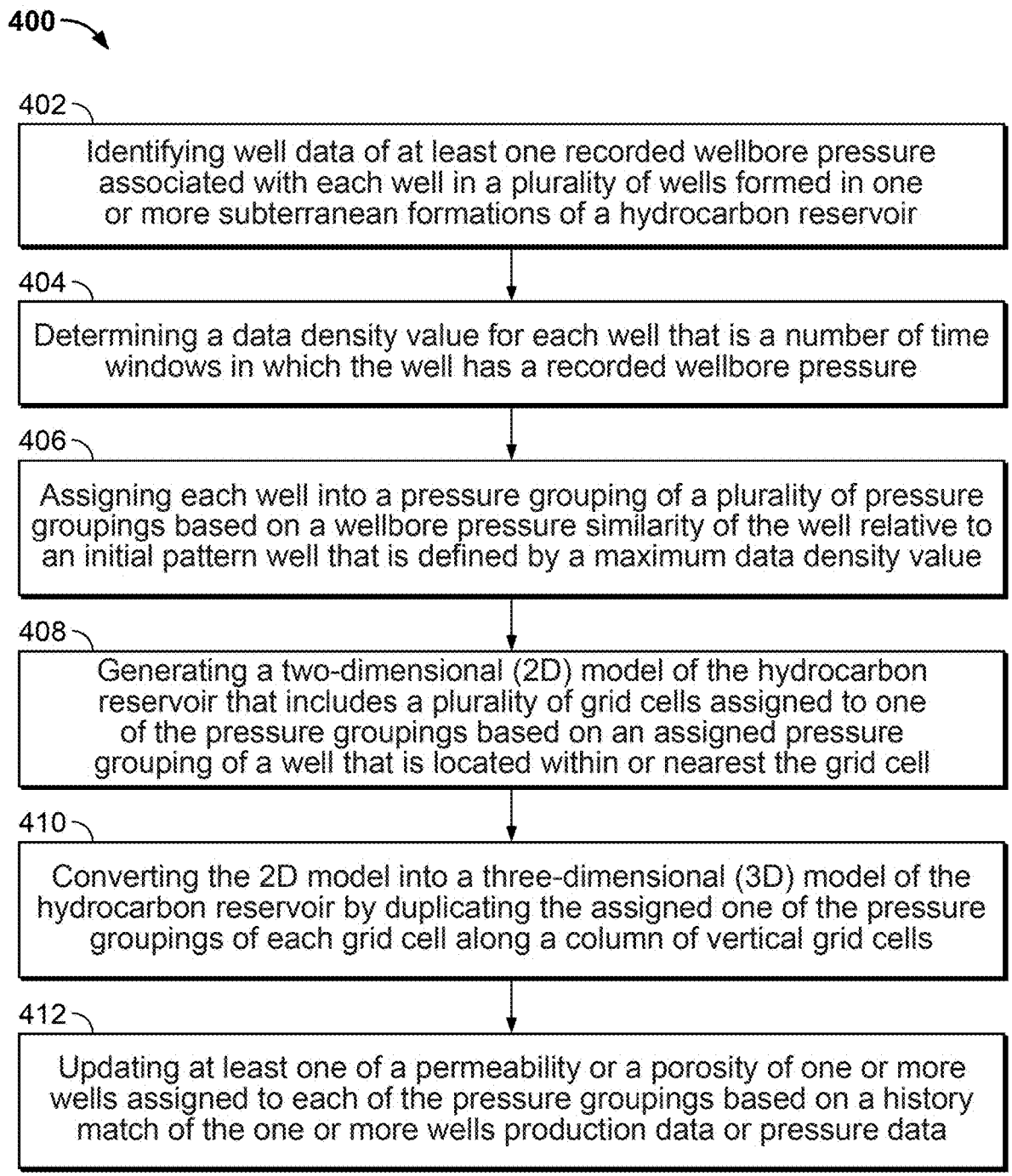
FIGS. 4A and 4B are flowcharts that describe example processes according to the present disclosure.
Figure 4B:
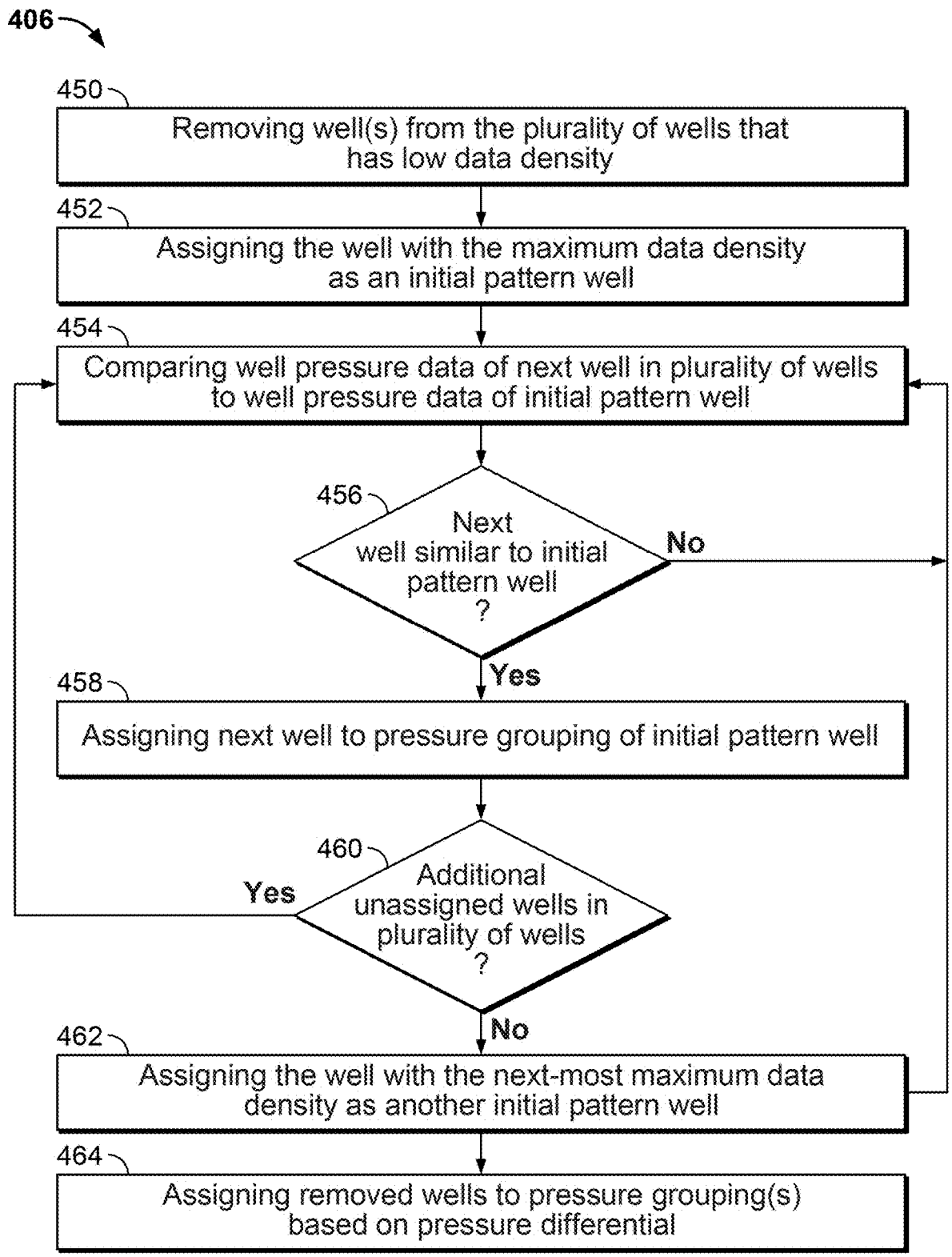

FIGS. 4A and 4B are flowcharts that describe an example process 400 (with FIG. 4B showing an example implementation of a particular step of process 400) according to the present disclosure. In some aspects, process 400 describes a workflow for a divide and conquer history-matching methodology, which can be separated into three stages (i) pressure grouping according to steps 402-406, (ii) reservoir region array creation according to steps 408 and 410, and (iii) history-matching using the regions' and aquifers' parameters according to step 412.

Process 400 can be implemented by or with the hydrocarbon production or monitoring system 200 in order to update hydrocarbon reservoir parameters utilizing a history-matching (HM) approach that updates one or more parameters, such as reservoir permeability, of a static model until the parameter dynamic response (for example, pressure) matches with observed data from the wells in the reservoir. Process 400 implements a history-matching technique that focuses on reservoir regions (for example, rather than individual wells within the reservoir), making the history-matching of process 400 faster and resulting in a better, predictive models as compared to conventional techniques.

Figure 5:
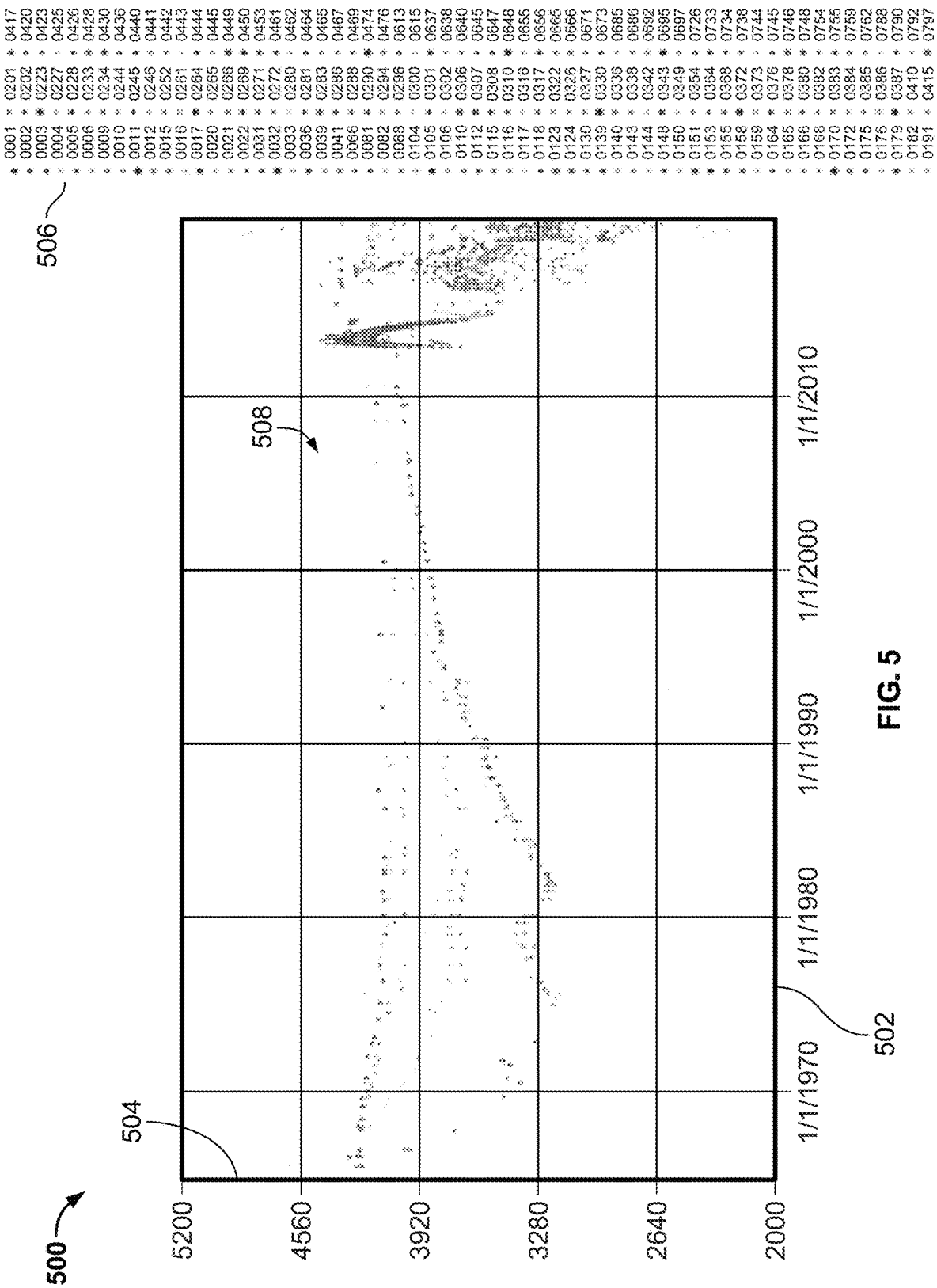
FIG. 5 is a graph that shows a historical data set of wellbore pressure from multiple wells in a hydrocarbon reservoir according to the present disclosure.

Process 400 begins at step 402, which includes identifying well data of at least one recorded wellbore pressure associated with each well in a plurality of wells formed in one or more subterranean formations of a hydrocarbon reservoir. For example, FIG. 5 shows a graph 500 of a data set of multiple (for example, hundreds) of wells 506 drilled into a reservoir. The data set includes time-dependent wellbore pressure data 508, with the x-axis 502 representing time in months, and the y-axis 504 represents pressure.

More generally, step 402 can include the amalgamation of all pressure data from all wells within a reservoir of interest. This historical pressure data can be broken down (for example, over the lifetime of the data set) into time windows; monthly time windows as shown in FIG. 5 can be used but other time windows are also contemplated. In some aspects, certain criteria can be employed on the data set. For example, each well should not contain more than one pressure data point per time window. A well containing multiple historical pressure data points within a given window may only retain a single representative value. These criteria are in place, for example, due to an assumption that one time window (for example, one month) is a short time for a well to have significantly different and equally valid historical pressure data points.

In some aspects, each time window may not necessarily have a pressure record for a particular well (or several wells). A time window without any record can be termed a null window.

Process 400 can continue at step 404, which includes determining a data density value for each well that is a number of time windows in which the well has a recorded wellbore pressure. A data density of a well is the number of windows within which it has a pressure record. An intersection window is one in which each of two wells has a pressure record. In some aspects, step 404 can also include ranking all wells in the data set in terms of data density. The well with the highest data density (in other words, the well with the most number of time windows with a pressure record) as an initial pattern well. Eventually, there may be many patterns in the dataset. However, a new pattern is defined after a complete comparison cycle of performing a similarity test (for example, within step 406) between the current initial pattern well and other, remaining (unassigned) wells in the data set. At the end of the comparison cycle with the initial pattern well, a next pattern well is the highest density well among the wells which failed the similarity test with the previous pattern well (with the initial pattern well being the first patter well). Wells with a data density of less than four (in other words, less than four months of recorded well pressure data) can be termed low density wells.

Process 400 can continue at step 406, which includes assigning each well into a pressure grouping of a plurality of pressure groupings based on a wellbore pressure similarity of the well relative to an initial pattern well that is defined by a maximum data density value. As noted, step 406 implements a similarity test between wells in the data set and a pattern well (for the first iteration, the initial pattern well).

Step 406 is also described with reference to FIG. 4B. As shown in FIG. 4B, step 406 can include multiple sub-steps, starting with step 450, which includes removing one or more wells from the plurality of wells that has low data density, such as a data density less than four. The well data set is then left with wells with data densities of four or greater.

Step 452 includes assigning the well with the maximum data density as an initial pattern well. For example, after the wells are ranked by data density in step 404, the well with the greatest or maximum data density can be assigned as the initial pattern well.

Step 454 includes comparing well pressure data of a next well in the plurality of wells to the well pressure data of the initial pattern well. For example, this step can be performed for each well in the data set that is not a low data density well and is not the initial pattern well. In some aspects, this comparison includes a comparison of an absolute pressure difference in the intersection windows between the well and the initial (or current) pattern well.

Step 456 includes a determination of whether or not the next well is similar to the initial pattern well based on the comparison of step 454. In an example implementation, the condition of step 456 is met ("yes") when 70% of the absolute pressure difference in their intersection windows is less than 100 psi. This condition can be represented mathematically as:

For $w \in w_{int}$ where $w_{int}$ is the set of all intersection windows between the pattern well and comparison well, if $|w_p^i - w_c^i| 100$, then $v=1$, otherwise 0 where $w_p^i$ and $w_c^i$ are the pressure records of the $i^{th}$ intersection window of the pattern and comparison wells, respectively. The similarity coefficient (Sc) can be defined as:

$$S_c = \frac{\sum_1^n v}{n}.$$

If the condition is not met, then step 456 reverts to step 454 and a comparison on the next well in the data set is performed with the pattern well (whether initial or current). If the condition is met, then step 456 continues to step 458, which includes assigning the next well to a pressure grouping that includes the initial pattern well (or current pattern well). In some aspects, if the similarity test succeeds between a comparison well and the initial pattern well, then the null monthly windows of the initial pattern well are augmented by the corresponding monthly window data of the similar comparison well. By doing this augmentation, the pattern well's density is increasing and making it more likely to have more intersection windows with the wells to be subsequently compared to it.

Step 460 includes a determination of whether or not there are additional unassigned wells (to a pressure grouping) in the plurality of wells in the data set. For example, if some wells have not been compared to the initial pattern well, then step 460 also reverts to 454. If all of the wells that are not the initial pattern well (or current pattern well) have been compared to the pattern well through steps 454-458, then step 460 reverts to step 462.

At this stage, there may be some unassigned wells; wells that failed the similarity condition with the initial pattern well and therefore, are not assigned to the pressure grouping of the initial pattern well. At the completion of a comparison cycle (steps 454-460), all the wells whose pressure records pass the similarity test with the pattern well used during the cycle are referred to as a pressure cluster or group. If, however, all wells have been assigned, then step 460 can revert to step 464. Step 462, however, includes assigning the well with the next-most maximum data density as another initial pattern well. For example, the well with the highest data density among the wells not yet belonging to any cluster or pressure grouping (in other words, unassigned) is chosen as the next pattern well, which can also be referred to as the current pattern well. With this current pattern well, step 462 can also revert back to step 454 for another comparison cycle.

Step 464 includes assigning the previously removed wells to pressure grouping(s) based on a pressure differential comparison. For example, as described in step 450, wells with data density values of less than four were removed initially from the well data set. In step 464, the removed wells are assigned to the pressure groupings that were defined through the iterations of steps 454-462. For example, in some aspects, the pressure differential comparison can be made between a root mean square (RMS) value of each low data density well's pressure data and the pressure value of each pressure grouping. Each low data density well can be assigned to the pressure grouping to which its RMS error is the least.

Figure 6A:
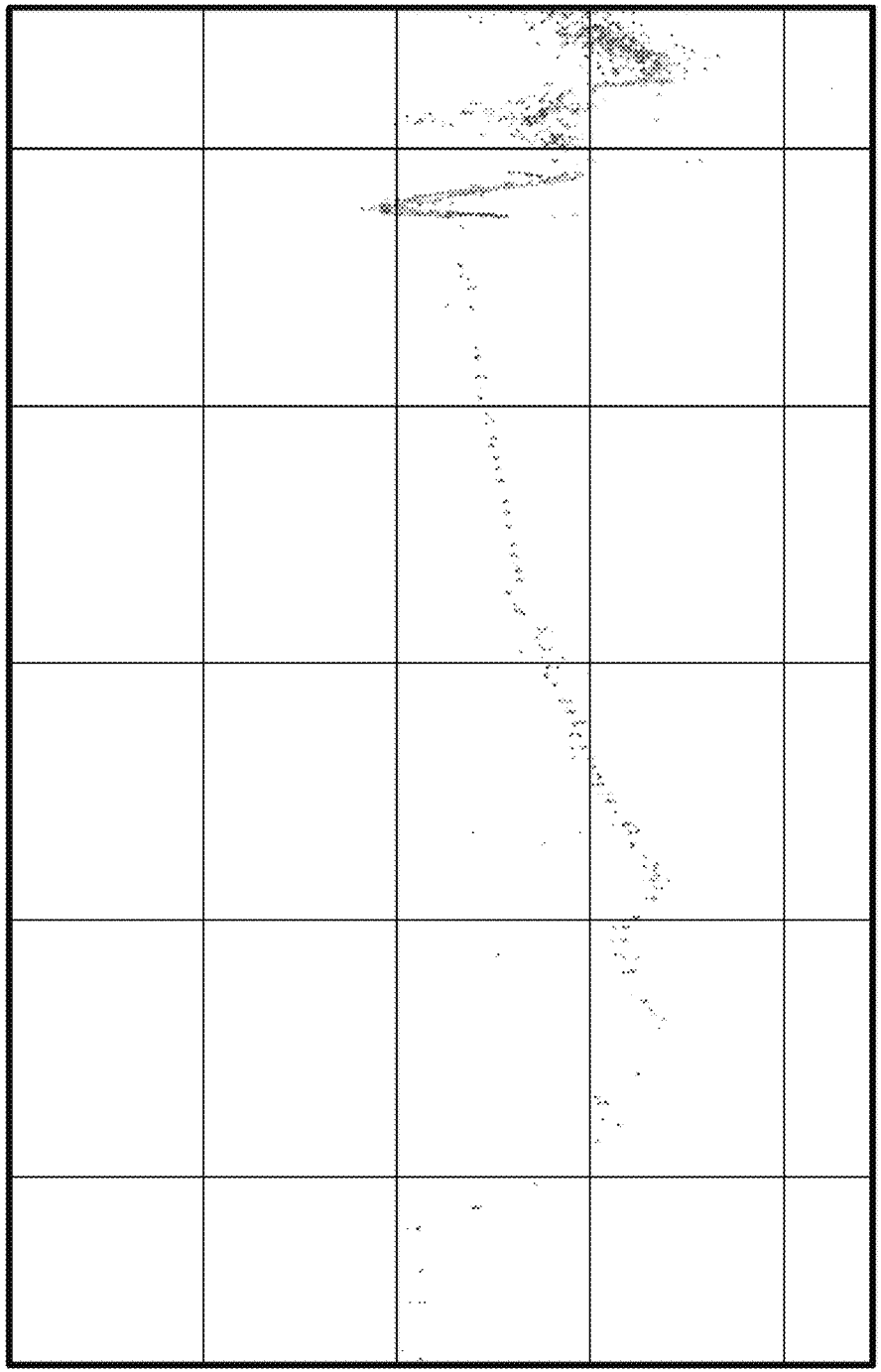
FIGS. 6A-6C are graphs that show pressure grouped regions of wells in a hydrocarbon reservoir according to the present disclosure.
Figure 6B:
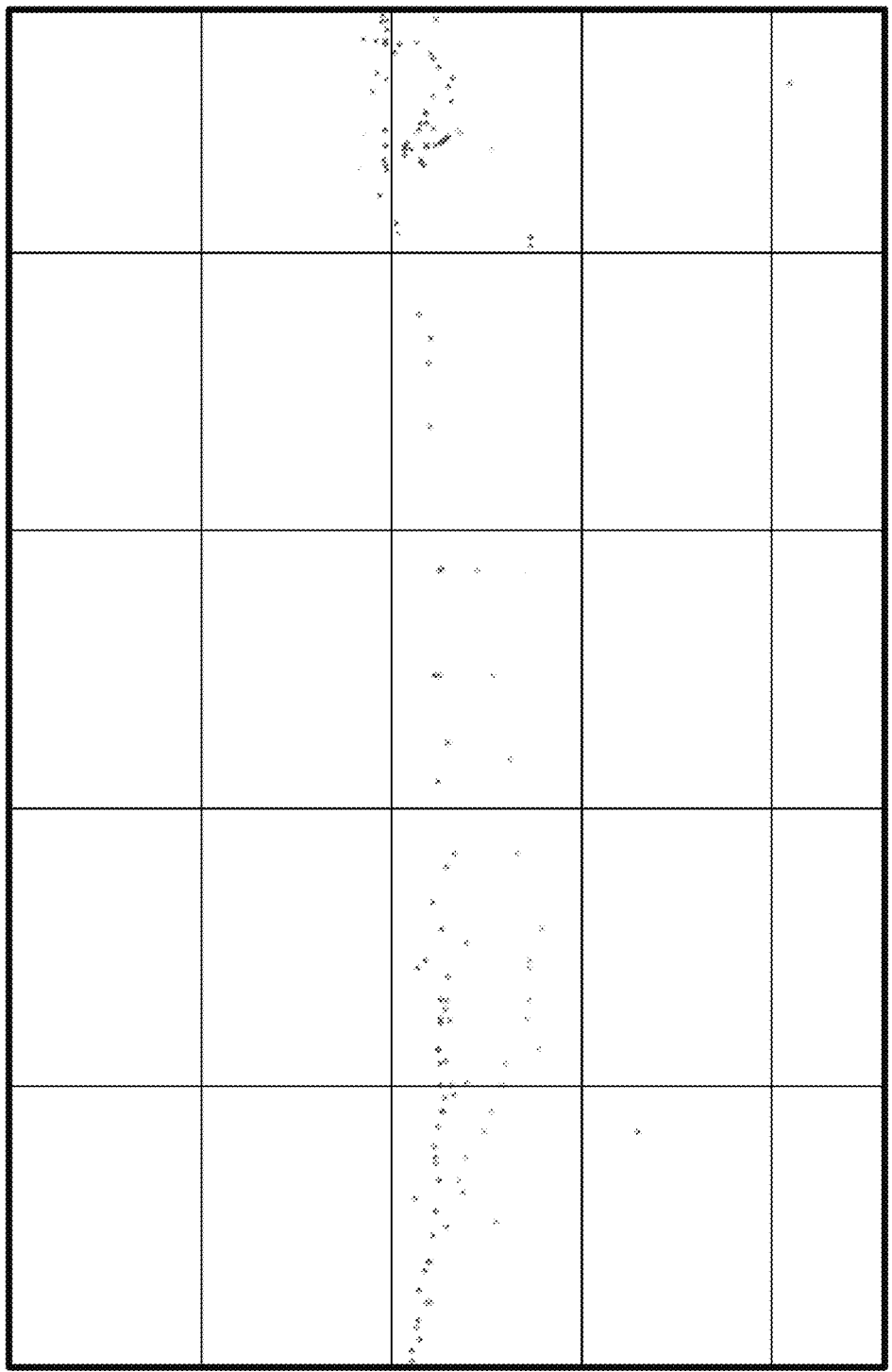
Figure 6C:
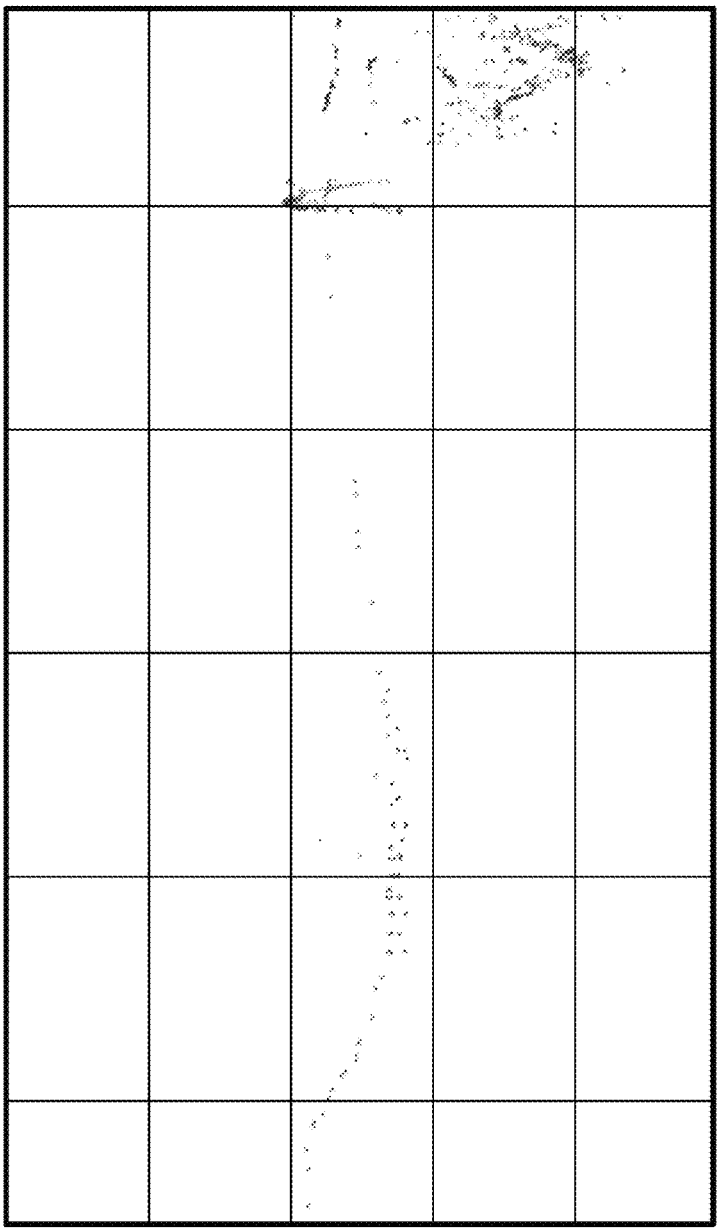

After this step, all wells in the data set have been assigned to one of n pressure groupings. With the example data set of graph 500 in mind, FIGS. 6A-6C are graphs that show pressure grouped regions of wells in a hydrocarbon reservoir according to the present disclosure. Each graph shows a plot of wellbore pressure per well over time windows. For example, graph 600 of FIG. 6A shows a portion of the wells 506 that have been assigned (through process step 406) to a first pressure grouping. Graph 620 of FIG. 6B shows a portion of the wells 506 that have been assigned (through process step 406) to a second pressure grouping. Graph 650 of FIG. 6C shows a portion of the wells 506 that have been assigned (through process step 406) to a third pressure grouping. Thus, using the wells 506 as a data set in the process 400, the iterative execution of step 406 (as described with reference to FIG. 4B) made for three pressure groups. Other data sets can make for fewer or more pressure groups.

Figure 7:
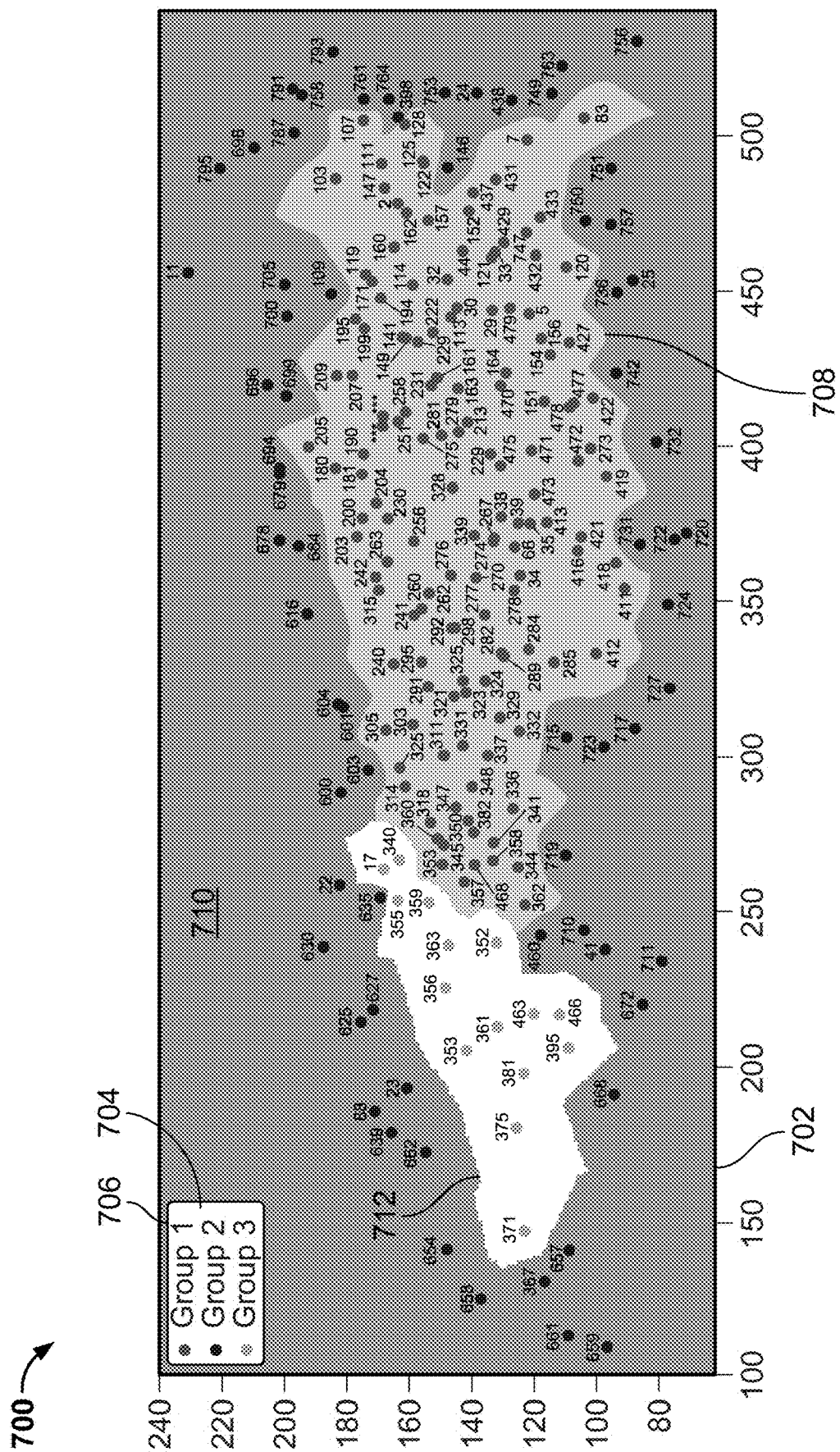
FIG. 7 shows a graph of wells within a hydrocarbon reservoir grouped by wellbore pressure according to the present disclosure.

After the completion of step 464, process 400 can continue with step 408 as shown in FIG. 4A. Step 408 includes generating a two-dimensional (2D) model of the hydrocarbon reservoir that includes a plurality of grid cells assigned to one of the pressure groupings based on an assigned pressure grouping of a well that is located within or nearest the grid cell. For example, FIG. 7 shows a graph 700 of wells within a hydrocarbon reservoir grouped by wellbore pressure within a 2D reservoir model according to the present disclosure. Graph 700 is defined by an x-axis 702 of distance as well as a y-axis 704 of distance to define a two-dimensional grid over a hydrocarbon reservoir. In graph 700, the data set of wells of graph 500 are shown split within the three pressure groupings as shown in chart 706. A first pressure grouping 708 includes a portion of the wells; a second pressure grouping 710 includes another portion of the wells; and a third pressure grouping 712 includes a final portion of the wells of the data set.

Figure 8A:
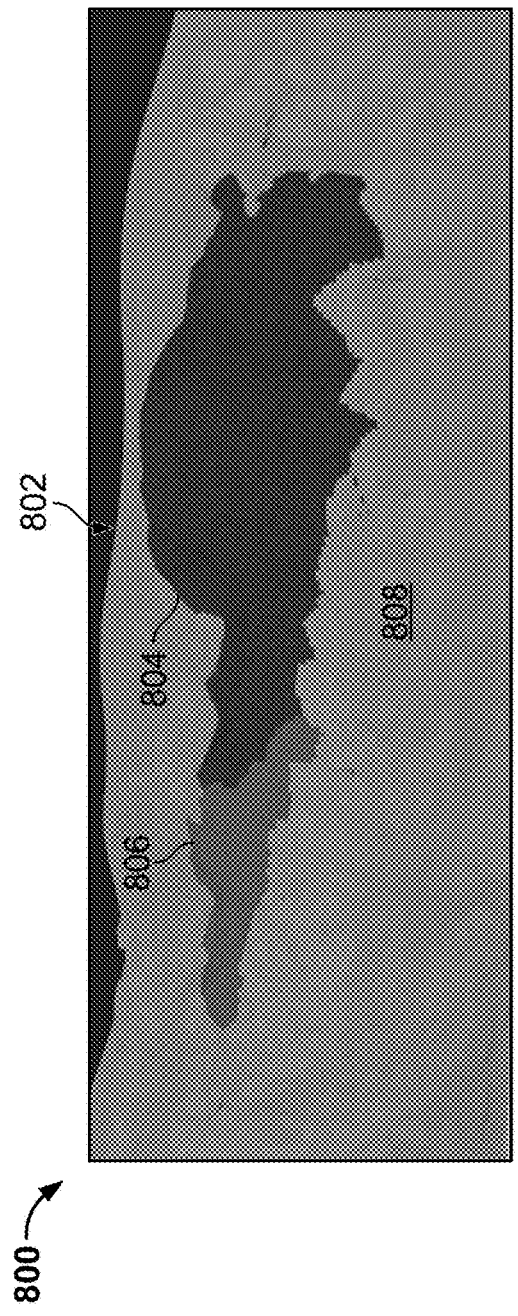
FIG. 8A shows a three-dimensional array of wells within a hydrocarbon reservoir grouped by wellbore pressure according to the present disclosure.

Step 410 includes converting the 2D model into a three-dimensional (3D) model of the hydrocarbon reservoir by duplicating the assigned one of the pressure groupings of each grid cell along a column of vertical grid cells. For example, FIG. 8A shows a graph 800 of a three-dimensional array of the wells in the data set of graph 700 within the hydrocarbon reservoir 802 grouped by wellbore pressure according to the present disclosure. As shown in FIG. 8A, the three pressure groupings of 708, 710, and 712 of graph 700 are now 3D modeled in pressure grouping 804, 808, and 806, respectively.

In some aspects, the 3D model is constructed by making up overlying layers of slices of the 2D model in step 410. Once the pressure group of a well has been determined, that pressure group is attributed to a topmost layer (in other words, shallowest) of the well's perforation. This topmost layer of the well's perforation has an address i, j, k. As an example, i=15, j=26 and k=5, where k is the topmost perforation of the well. The same pressure group is then attributed to all grid-blocks 15, 26, h, where h=1 to maximum of layers.

Figure 11A:
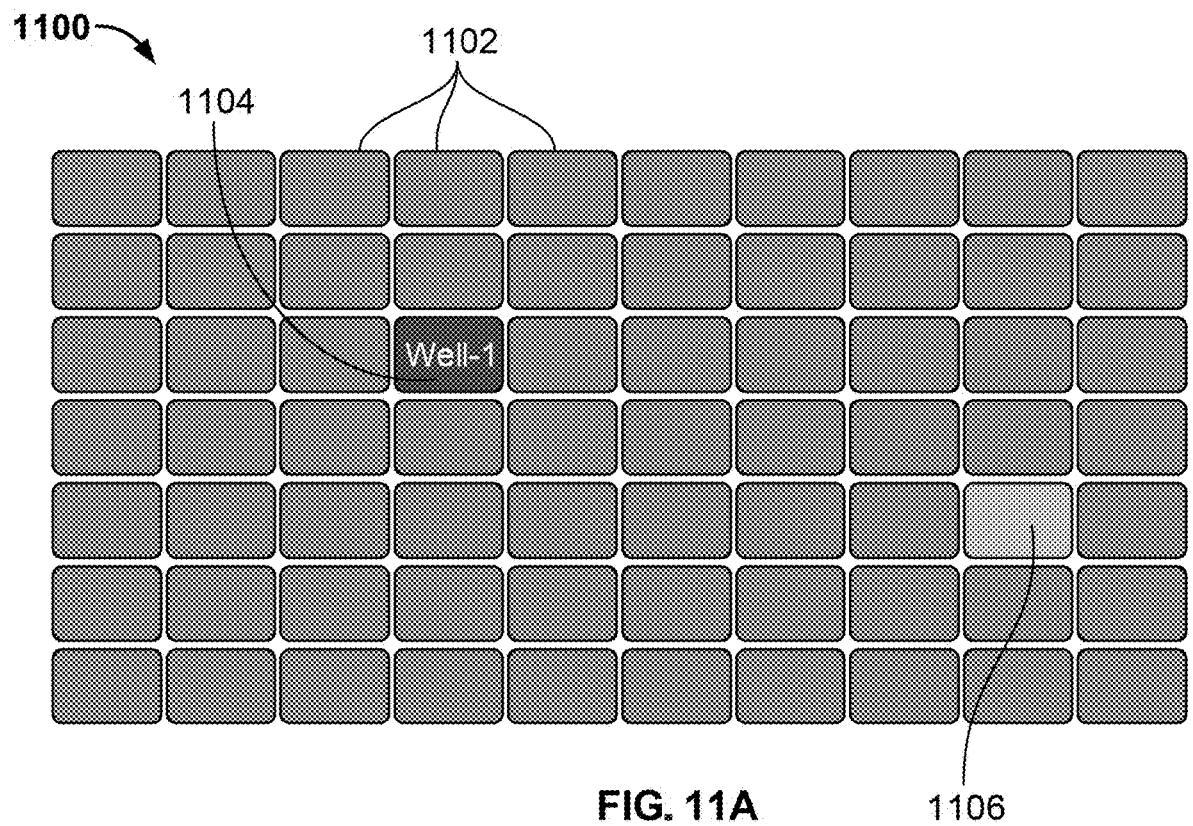
FIGS. 11A-11C show graphs of multiple layers of a three-dimensional model of a hydrocarbon reservoir with multiple wells grouped into pressure groupings according to the present disclosure.
Figure 11B:
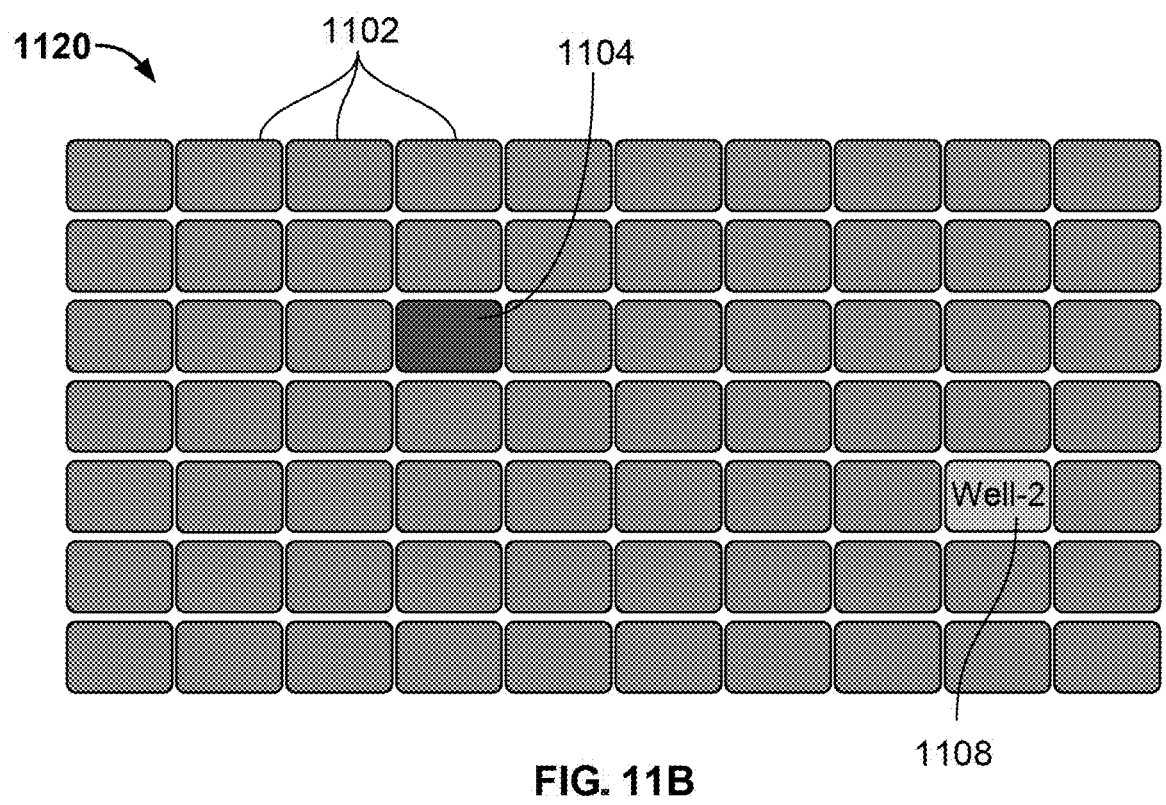
Figure 11C:
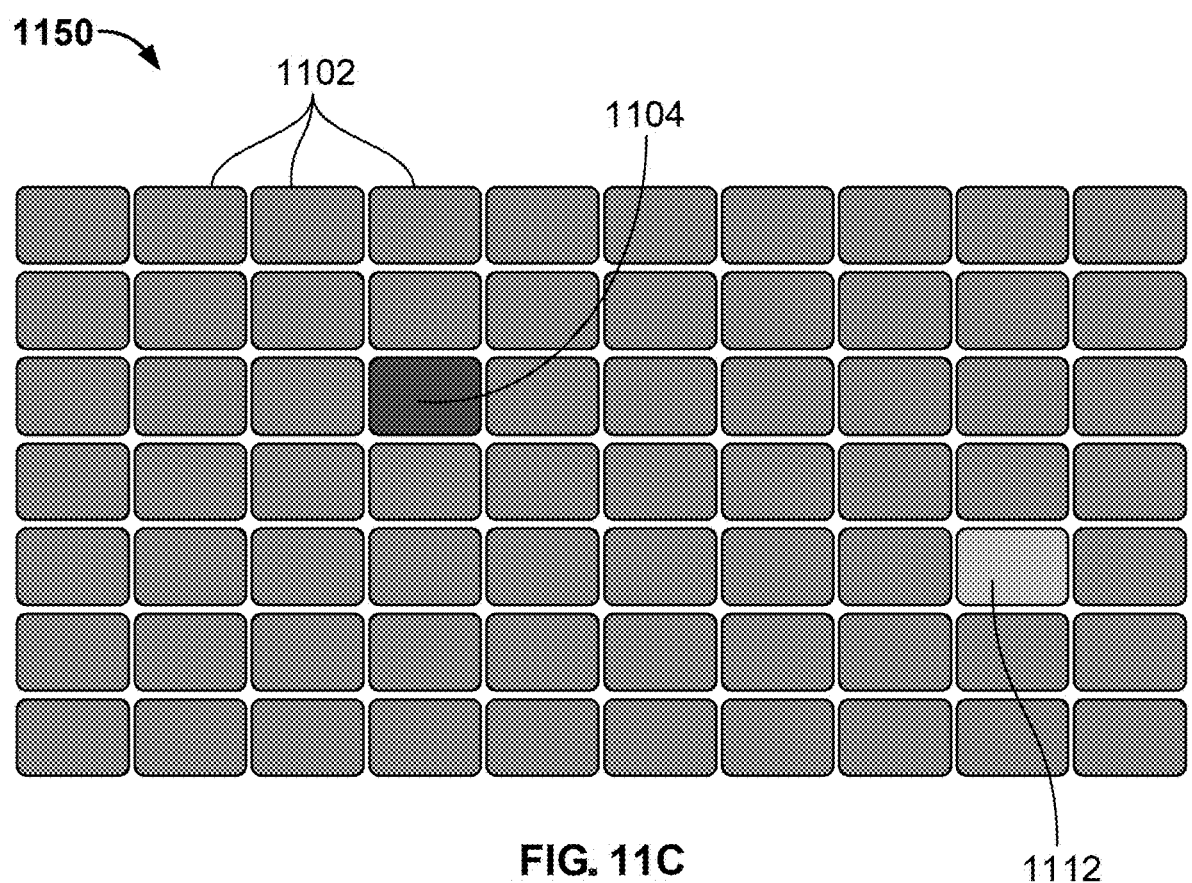

FIGS. 11A-11C show graphs of multiple layers of a three-dimensional model of a hydrocarbon reservoir with multiple wells grouped into pressure groupings according to the present disclosure. These figures show layers 1100, 1120, and 1150 that represent 2D slices of a model having 3 layers. Grid cells 1102 occupy each layer 1100, 1120, and 1150. Cell 1104 on layer 1100 represents well 1. As shown, a topmost perforation on well-1 is in layer 1100, and hence the wells pressure group is attributed to the same i, j address across the other layers 1120 and 1150. Cell 1108 on layer 1120 represents well 2. The topmost perforation of well-2 is in the layer 1120, and its pressure group) is attributed to same i, j address in layers 1100 and 1150 as shown.

Once a pressure group has been obtained for the equivalent i, j addresses for all wells on the layer 1100, then the population of pressure groups to all non-well grids is done based on that layer. The result obtained on layer 1100 can then be populated down to all layers of each i, j of layer 1100.

Figure 10:
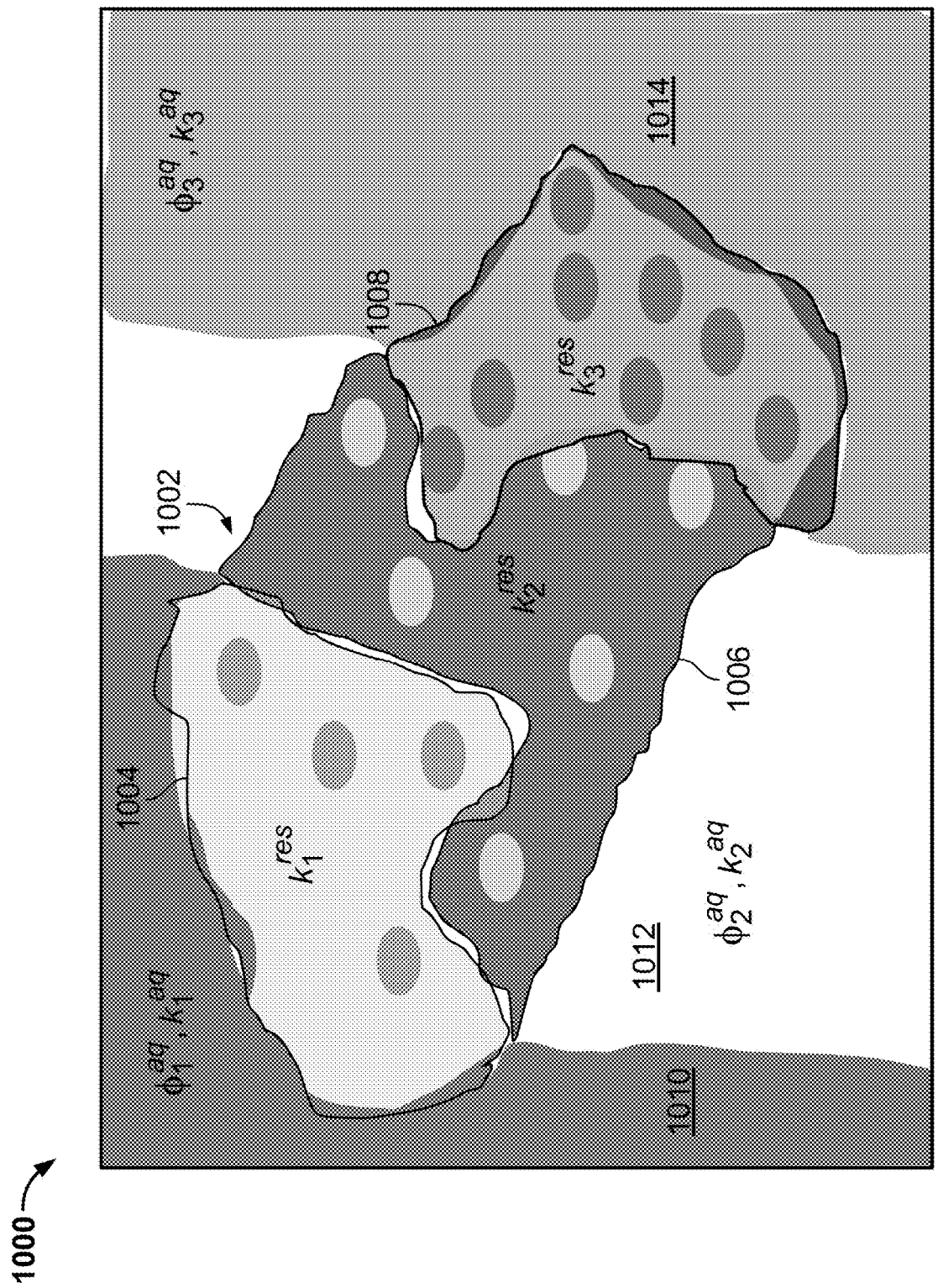
FIG. 10 is a graphic illustration of a hydrocarbon reservoir including multiple wells grouped within multiple pressure groupings and aquifer regions according to the present disclosure.

As previously described, the 3D model can also account for the aquifer regions of the hydrocarbon reservoir 802 shown in the graph 800 of the 3D model. For example, turning to FIG. 10, this figure is a graphic illustration 1000 of a hydrocarbon reservoir 1002 including multiple wells grouped within multiple pressure groupings 1004, 1006, and 1008 and aquifer regions 1010, 1012, and 1014 according to the present disclosure. As previously described, aquifer regions 1010, 1012, and 1014 are the sections of the model's aquifer that are in direct contact with each pressure grouping 1004, 1006, and 1008. Three aquifer regions 1010, 1012, and 1014 are shown in FIG. 3C (but there can be more). In addition, this figures also shows parameters to be ag is the optimized to obtain each pressure region's history-matching of pressure. As examples, $k_1^{aq}$ permeability multiplier of aquifer region 1010, $k_1^{res}$ is the permeability multiplier of the pressure region 1012, and $\emptyset_1^{aq}$ is the porosity multiplier of aquifer region 1014. As described, the pressure clustering or grouping is achieved through step 406 of process 400, while the creation of the reservoir region achieved through the simulator algorithm (for example, the Voronoi algorithm). The created reservoir region or model (for example, in 3D) as well as the created aquifer regions (in array form) can be attached to a simulation model file.

Figure 8B:
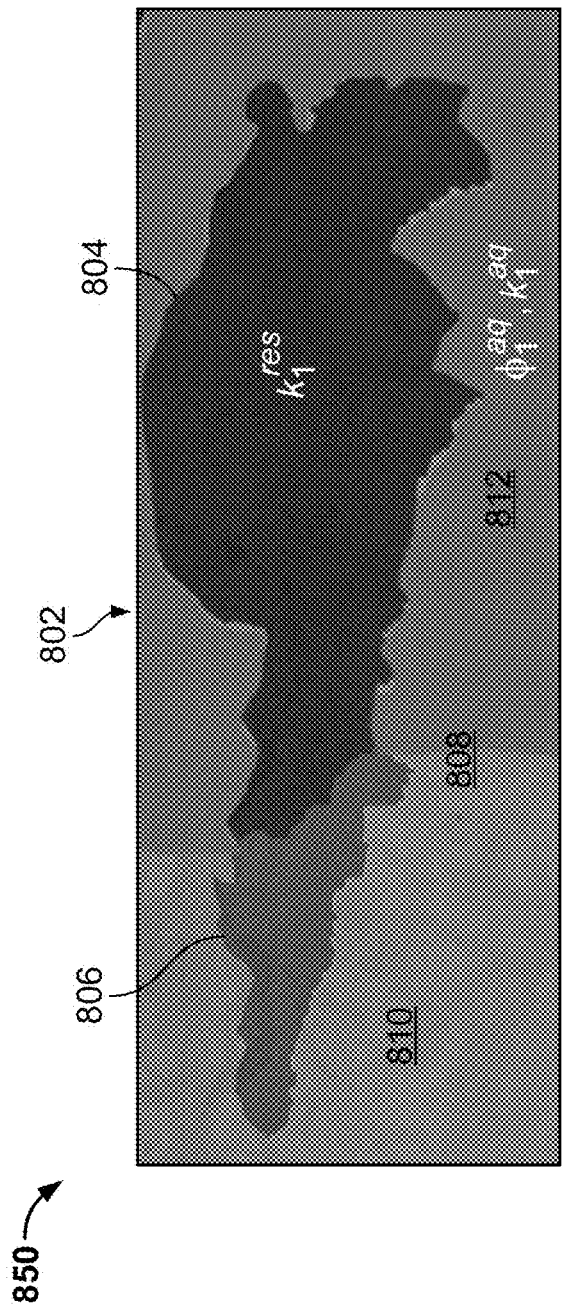
FIG. 8B shows a three-dimensional array of wells within a hydrocarbon reservoir grouped by wellbore pressure with one or more overlaid aquifer regions according to the present disclosure.

FIG. 8B shows a three-dimensional array of wells within a hydrocarbon reservoir grouped by wellbore pressure with one or more overlaid aquifer regions according to the present disclosure. The graph 850 of FIG. 8B shows the hydrocarbon reservoir 802, and the pressure groupings 804, 806, and 806 of FIG. 8A. Graph 850 also shows a global aquifer region, which is split into two aquifer regions 810 and 812 as illustrated. In some aspects, inclusion of the aquifer regions can be advantageous, as the permeability and porosity of an aquifer are a part of the regional parameters to be updated in other to obtain a history-match of the reservoir.

Figure 9A:
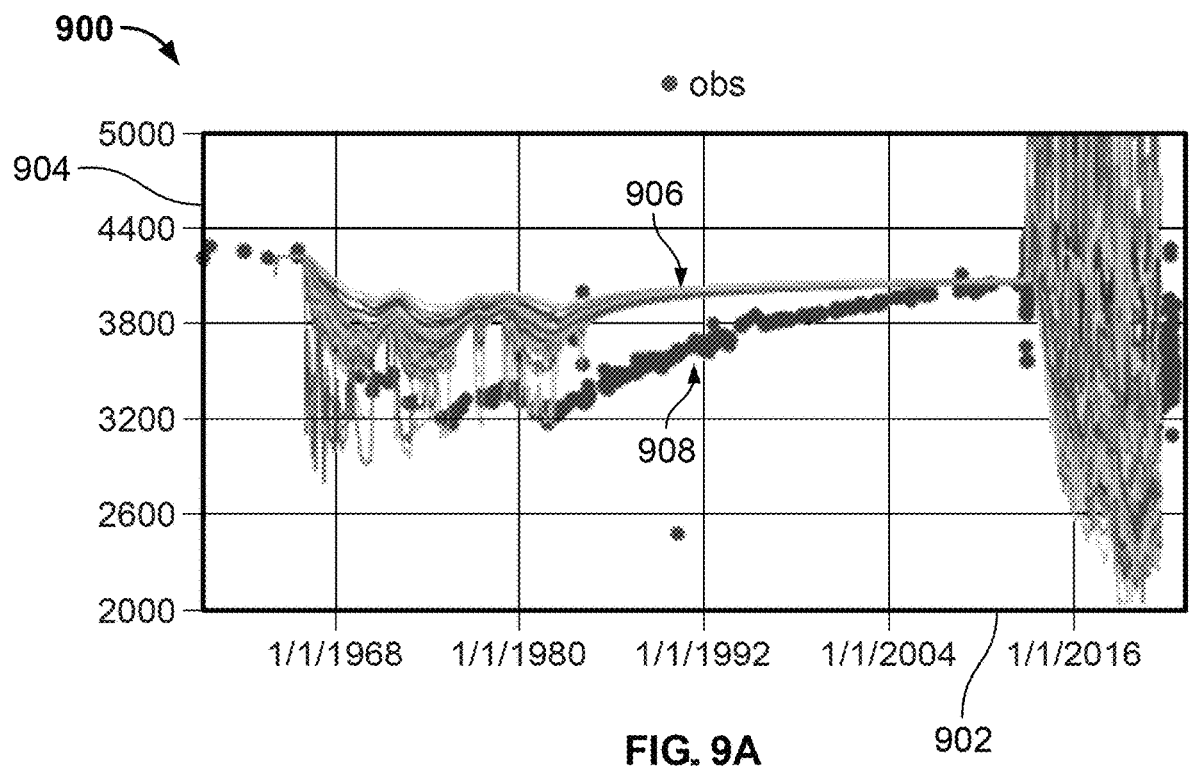
FIGS. 9A and 9B are graphs that show simulated pressures of the wells in in particular pressure groupings and the group pressures according to the present disclosure.

Returning to FIG. 4A, step 412 includes updating at least one of a permeability or a porosity of one or more wells assigned to each of the pressure groupings based on a history match of the one or more wells production data or pressure data. For example, with continued reference to graphs 800 and 850, and in order to history-match the well pressures in pressure grouping 804, for example, traditional approaches may focus on well-by-well strategy, updating permeability locally around individual wells, which takes a lot of time and does not allow the locations only the model without any wells to benefit from the actions needed to match the wells' data. However, using the divide and conquer approach, the simulated pressures of the wells in pressure grouping 804 can be plotted on the region's pressure grouping 804 as shown in FIG. 9A. This figure shows a graph 900 with x-axis 902 of time windows (in this case, 12 year windows) and y-axis 904 of wellbore pressure. The plotted simulated pressures 906 of the wells in the pressure grouping 804 over time are shown with the linear plots, while the pressure of the pressure grouping is shown in plot 908.

Figure 9B:
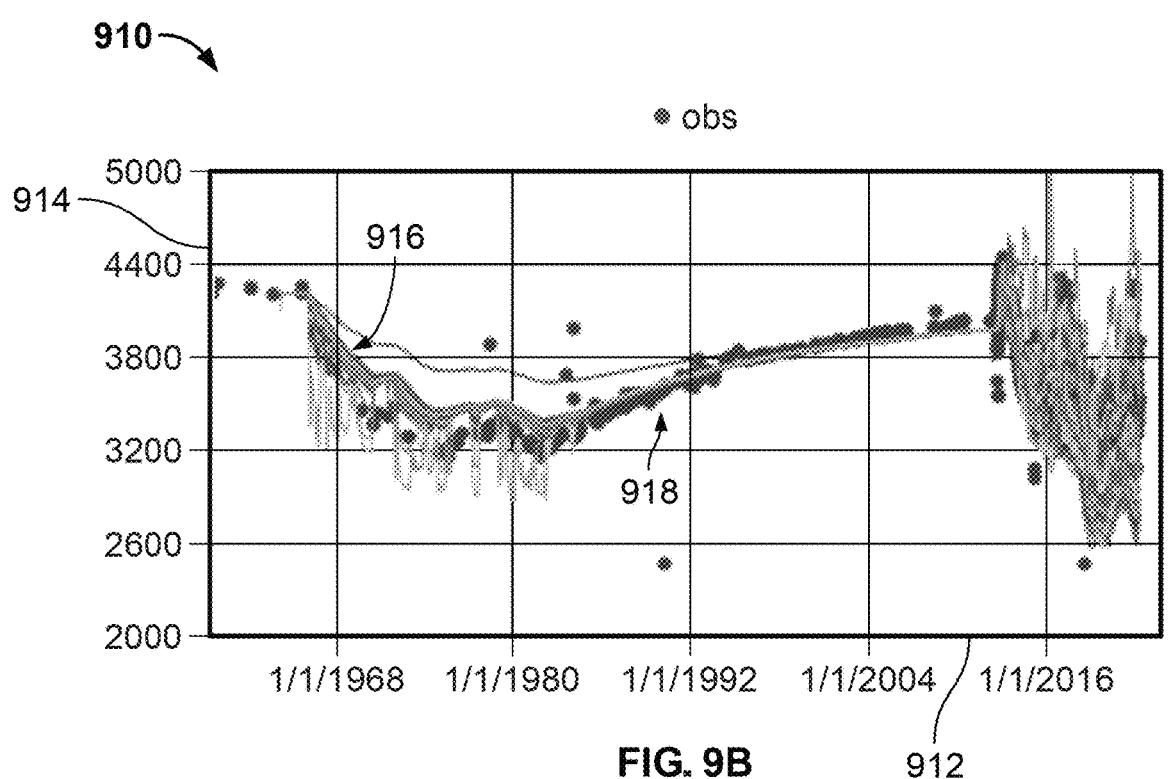

By modifying aquifer region permeability and reservoir region permeability, a simultaneous match was obtained for all the wells in pressure grouping 804 as shown in FIG. 9B. This figure shows a graph 910 with x-axis 912 of time windows (in this case, 12 year windows) and y-axis 914 of wellbore pressure. The plotted simulated pressures 916 of the wells in the pressure grouping 804 over time are shown with the linear plots, while the pressure of the pressure grouping is shown in plot 918. The simulated pressures 916 are obtained by sub-global permeability updates on the applicable reservoir region and its associated aquifer region.

Figure 12:
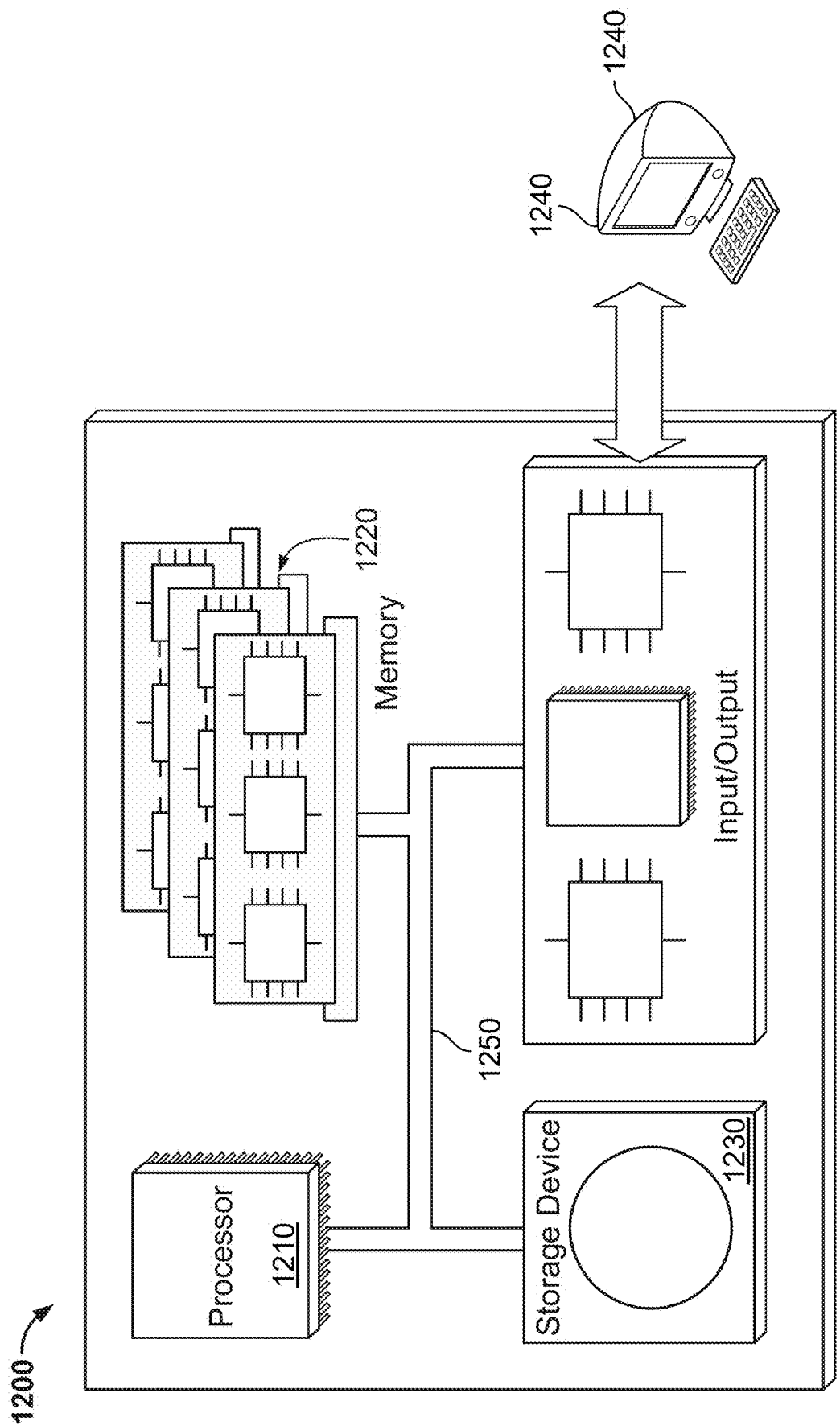
FIG. 12 is a schematic illustration of an example controller (or control system) for computer-implemented operations according to the present disclosure.

FIG. 12 is a schematic illustration of an example controller 1200 (or control system) for implementing or executing operations and processes according to the present disclosure. The controller 1200 is intended to include various forms of digital computers, such as printed circuit boards (PCB), processors, digital circuitry, or otherwise parts of a biocide testing system. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the controller 1200. The processor may be designed using any of a number of architectures. For example, the processor 1210 may be a CISC (Complex Instruction Set Computers) processor, a RISC (Reduced Instruction Set Computer) processor, or a MISC (Minimal Instruction Set Computer) processor.

In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the controller 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the controller 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the controller 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method of updating one or more hydrocarbon parameters, comprising:

identifying, with a computing system, well data associated with a plurality of wells formed in one or more subterranean formations of a hydrocarbon reservoir, the well data comprising at least one recorded wellbore pressure associated with each well in the plurality of wells;

determining, with the computing system, a data density value for each well of the plurality of wells, where the data density value comprises a number of time windows in which the well has a recorded wellbore pressure;

determining, with the computing system, at least one well of the plurality of wells that has a data density value less than a threshold value;

removing, with the computing system, the determined at least one well from the plurality of wells;

assigning, with the computing system, each well of the plurality of wells into a pressure grouping of a plurality of pressure groupings based on a wellbore pressure similarity of the well relative to an initial pattern well that is defined by a maximum data density value, wherein the assigning comprises:

determining, with the computing system, for each removed well, a differential between the recorded pressure data of the removed well and a pressure of each of the plurality of pressure groupings; and assigning, with the computing system, each removed well to a particular pressure grouping based on the differential between the recorded pressure data of the removed well and the pressure the particular pressure grouping being minimal;

generating, with the computing system, a two-dimensional (2D) model of the hydrocarbon reservoir that comprises a plurality of grid cells, each grid cell assigned to one of the plurality of pressure groupings based on an assigned pressure grouping of a well of the plurality of wells that is located within or nearest the grid cell;

converting, with the computing system, the 2D model into a three-dimensional (3D) model of the hydrocarbon reservoir by duplicating the assigned one of the plurality of pressure groupings of each grid cell along a column of vertical grid cells; and updating, with the computing system, at least one of a permeability or a porosity associated with a grid cell of the 3D model that is assigned to each of the plurality of pressure groupings based on a history match of the one or more wells production data or pressure data.

2. The computer-implemented method of claim 1, further comprising:

generating, with the computing system, one or more well field management operations based on the history match of the one or more wells production data or pressure data.

3. The computer-implemented method of claim 1, wherein the assigning comprises:

comparing, with the computing system, the at least one recorded wellbore pressure associated with each well in the plurality of wells against the recorded wellbore pressure associated with the initial pattern well to determine a similarity coefficient for each well of the plurality of wells exclusive of the initial pattern well;

assigning, with the computing system, each well with the similarity coefficient greater than a particular value to the pressure grouping of the initial pattern well;

determining, with the computing system, another initial pattern well that is defined by a next-most maximum data density value;

comparing, with the computing system, the at least one recorded wellbore pressure associated with each unassigned well in the plurality of wells against the recorded wellbore pressure associated with the another initial pattern well to determine a similarity coefficient for each unassigned well of the plurality of wells exclusive of the another initial pattern well; and assigning, with the computing system, each unassigned well with the similarity coefficient greater than the particular value to the pressure grouping of the another initial pattern well.

4. The computer-implemented method of claim 3, further comprising:

updating, with the computing system, recorded pressure data in a time window associated with the initial pattern well with recorded pressure data of the each well assigned to the pressure grouping of the initial pattern well; and updating, with the computing system, recorded pressure data in a time window associated with the another initial pattern well with recorded pressure data of the each well assigned to the pressure grouping of the another initial pattern well.

5. The computer-implemented method of claim 1, wherein the differential comprises a root mean square differential.

6. The computer-implemented method of claim 1, further comprising:

determining, with the computing system, for each cell in the 3D model associated with a particular pressure grouping, a depth level of the cell relative to a free water level; and assigning, with the computing system, each cell with the depth level below the free water level as an aquifer cell.

7. The computer-implemented method of claim 6, wherein the depth level of the cell is based on a perforation depth of a perforation in the well.

8. The computer-implemented method of claim 6, further comprising:

associating, with the computing system, each aquifer cell to the particular pressure grouping.

9. The computer-implemented method of claim 2, further comprising:

determining, with the computing system, for each cell in the 3D model associated with a particular pressure grouping, a depth level of the cell relative to a free water level;

assigning, with the computing system, each cell with the depth level below the free water level as an aquifer cell; and associating, with the computing system, each aquifer cell to the particular pressure grouping.

10. The computer-implemented method of claim 9, wherein the depth level of the cell is based on a perforation depth of a perforation in the well.

11. A computing system, comprising:

one or more tangible, non-transitory memory; and one or more hardware processors communicably coupled to the one or more tangible, non-transitory memory and configured to execute instructions stored on the memory to perform operations comprising:

identifying well data associated with a plurality of wells formed in one or more subterranean formations of a hydrocarbon reservoir, the well data comprising at least one recorded wellbore pressure associated with each well in the plurality of wells;

determining a data density value for each well of the plurality of wells, where the data density value comprises a number of time windows in which the well has a recorded wellbore pressure;

determining at least one well of the plurality of wells that has a data density value less than a threshold value;

removing the determined at least one well from the plurality of wells;

assigning each well of the plurality of wells into a pressure grouping of a plurality of pressure groupings based on a wellbore pressure similarity of the well relative to an initial pattern well that is defined by a maximum data density value, wherein the operation of assigning comprises:

determining for each removed well, a differential between the recorded pressure data of the removed well and a pressure of each of the plurality of pressure groupings; and assigning each removed well to a particular pressure grouping based on the differential between the recorded pressure data of the removed well and the pressure the particular pressure grouping being minimal;

generating a two-dimensional (2D) model of the hydrocarbon reservoir that comprises a plurality of grid cells, each grid cell assigned one of the plurality of pressure groupings based on an assigned pressure grouping of a well of the plurality of wells that is located within or nearest the grid cell;

converting the 2D model into a three-dimensional (3D) model of the hydrocarbon reservoir by duplicating the assigned one of the plurality of pressure groupings of each grid cell along a column of vertical grid cells; and updating at least one of a permeability or a porosity associated with a grid block of the 3D model that is assigned to each of the plurality of pressure groupings based on a history match of the one or more wells production data or pressure data.

12. The computing system of claim 11, wherein the operations further comprise:
generating one or more well field management operations based on the history match of the one or more wells production data or pressure data.

13. The computing system of claim 11, wherein the operation of assigning comprises:
comparing the at least one recorded wellbore pressure associated with each well in the plurality of wells against the recorded wellbore pressure associated with the initial pattern well to determine a similarity coefficient for each well of the plurality of wells exclusive of the initial pattern well;
assigning each well with the similarity coefficient greater than a particular value to the pressure grouping of the initial pattern well;
determining another initial pattern well that is defined by a next-most maximum data density value;
comparing the at least one recorded wellbore pressure associated with each unassigned well in the plurality of wells against the recorded wellbore pressure associated with the another initial pattern well to determine a similarity coefficient for each unassigned well of the plurality of wells exclusive of the another initial pattern well; and
assigning each unassigned well with the similarity coefficient greater than the particular value to the pressure grouping of the another initial pattern well.

14. The computing system of claim 13, wherein the operations further comprise:
updating recorded pressure data in a time window associated with the initial pattern well with recorded pressure data of the each well assigned to the pressure grouping of the initial pattern well; and
updating recorded pressure data in a time window associated with the another initial pattern well with recorded pressure data of the each well assigned to the pressure grouping of the another initial pattern well.

15. The computing system of claim 11, wherein the differential comprises a root mean square differential.

16. The computing system of claim 11, wherein the operations further comprise:
determining for each cell in the 3D model associated with a particular pressure grouping, a depth level of the cell relative to a free water level; and
assigning each cell with the depth level below the free water level as an aquifer cell.

17. The computing system of claim 16, wherein the depth level of the cell is based on a perforation depth of a perforation in the well.

18. The computing system of claim 16, wherein the operations further comprise:
associating each aquifer cell to the particular pressure grouping.

19. The computing system of claim 12, wherein the operation of assigning comprises:
comparing the at least one recorded wellbore pressure associated with each well in the plurality of wells against the recorded wellbore pressure associated with the initial pattern well to determine a similarity coefficient for each well of the plurality of wells exclusive of the initial pattern well;
assigning each well with the similarity coefficient greater than a particular value to the pressure grouping of the initial pattern well;
determining another initial pattern well that is defined by a next-most maximum data density value;
comparing the at least one recorded wellbore pressure associated with each unassigned well in the plurality of wells against the recorded wellbore pressure associated with the another initial pattern well to determine a similarity coefficient for each unassigned well of the plurality of wells exclusive of the another initial pattern well; and
assigning each unassigned well with the similarity coefficient greater than the particular value to the pressure grouping of the another initial pattern well.

20. The computing system of claim 19, wherein the operations further comprise:
updating recorded pressure data in a time window associated with the initial pattern well with recorded pressure data of the each well assigned to the pressure grouping of the initial pattern well; and
updating recorded pressure data in a time window associated with the another initial pattern well with recorded pressure data of the each well assigned to the pressure grouping of the another initial pattern well.

21. An apparatus comprising one or more tangible, non-transitory memory configured to store instructions operable, when executed by one or more hardware processors, to cause the one or more hardware processors to perform operations comprising:
identifying well data associated with a plurality of wells formed in one or more subterranean formations of a hydrocarbon reservoir, the well data comprising at least one recorded wellbore pressure associated with each well in the plurality of wells;
determining a data density value for each well of the plurality of wells, where the data density value comprises a number of time windows in which the well has a recorded wellbore pressure;
determining at least one well of the plurality of wells that has a data density value less than a threshold value;
removing the determined at least one well from the plurality of wells;
assigning each well of the plurality of wells into a pressure grouping of a plurality of pressure groupings based on a wellbore pressure similarity of the well relative to an initial pattern well that is defined by a maximum data density value, wherein the operation of assigning comprises:
determining for each removed well, a differential between the recorded pressure data of the removed well and a pressure of each of the plurality of pressure groupings; and
assigning each removed well to a particular pressure grouping based on the differential between the recorded pressure data of the removed well and the pressure the particular pressure grouping being minimal;
generating a two-dimensional (2D) model of the hydrocarbon reservoir that comprises a plurality of grid cells, each grid cell assigned one of the plurality of pressure groupings based on an assigned pressure grouping of a well of the plurality of wells that is located within or nearest the grid cell;
converting the 2D model into a three-dimensional (3D) model of the hydrocarbon reservoir by duplicating the assigned one of the plurality of pressure groupings of each grid cell along a column of vertical grid cells; and updating at least one of a permeability or a porosity associated with a grid block of the 3D model that is assigned to each of the plurality of pressure groupings based on a history match of the one or more wells production data or pressure data.

22. The apparatus of claim 21, wherein the operations further comprise:

generating one or more well field management operations based on the history match of the one or more wells production data or pressure data.

23. The apparatus of claim 21, wherein the operation of assigning comprises:

comparing the at least one recorded wellbore pressure associated with each well in the plurality of wells against the recorded wellbore pressure associated with the initial pattern well to determine a similarity coefficient for each well of the plurality of wells exclusive of the initial pattern well;

assigning each well with the similarity coefficient greater than a particular value to the pressure grouping of the initial pattern well;

determining another initial pattern well that is defined by a next-most maximum data density value;

comparing the at least one recorded wellbore pressure associated with each unassigned well in the plurality of wells against the recorded wellbore pressure associated with the another initial pattern well to determine a similarity coefficient for each unassigned well of the plurality of wells exclusive of the another initial pattern well; and assigning each unassigned well with the similarity coefficient greater than the particular value to the pressure grouping of the another initial pattern well.

24. The apparatus of claim 23, wherein the operations further comprise:

updating recorded pressure data in a time window associated with the initial pattern well with recorded pressure data of the each well assigned to the pressure grouping of the initial pattern well; and updating recorded pressure data in a time window associated with the another initial pattern well with recorded pressure data of the each well assigned to the pressure grouping of the another initial pattern well.

25. The apparatus of claim 21, wherein the differential comprises a root mean square differential.

26. The apparatus of claim 21, wherein the operations further comprise:

determining for each cell in the 3D model associated with a particular pressure grouping, a depth level of the cell relative to a free water level; and assigning each cell with the depth level below the free water level as an aquifer cell.

27. The apparatus of claim 26, wherein the depth level of the cell is based on a perforation depth of a perforation in the well.

28. The apparatus of claim 26, wherein the operations further comprise:

associating each aquifer cell to the particular pressure grouping.

29. The apparatus of claim 21, wherein the operation of assigning comprises:

comparing the at least one recorded wellbore pressure associated with each well in the plurality of wells against the recorded wellbore pressure associated with the initial pattern well to determine a similarity coefficient for each well of the plurality of wells exclusive of the initial pattern well;

assigning each well with the similarity coefficient greater than a particular value to the pressure grouping of the initial pattern well;

determining another initial pattern well that is defined by a next-most maximum data density value;

comparing the at least one recorded wellbore pressure associated with each unassigned well in the plurality of wells against the recorded wellbore pressure associated with the another initial pattern well to determine a similarity coefficient for each unassigned well of the plurality of wells exclusive of the another initial pattern well; and assigning each unassigned well with the similarity coefficient greater than the particular value to the pressure grouping of the another initial pattern well, and wherein the operations further comprise:

updating recorded pressure data in a time window associated with the initial pattern well with recorded pressure data of the each well assigned to the pressure grouping of the initial pattern well; and updating recorded pressure data in a time window associated with the another initial pattern well with recorded pressure data of the each well assigned to the pressure grouping of the another initial pattern well.

30. The apparatus of claim 29, wherein the differential comprises a root mean square differential.

* * * * *